United States Patent
Xu et al.

(10) Patent No.: US 12,335,817 B2
(45) Date of Patent: Jun. 17, 2025

(54) MULTICAST SENDING AND RECEIVING METHOD AND APPARATUS

(71) Applicant: HUAWEI TECHNOLOGIES CO., LTD., Shenzhen (CN)

(72) Inventors: Bin Xu, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/809,778

(22) Filed: Jun. 29, 2022

(65) Prior Publication Data

US 2022/0353641 A1  Nov. 3, 2022

Related U.S. Application Data

(63) Continuation of application No. PCT/CN2019/130452, filed on Dec. 31, 2019.

(51) Int. Cl.
*H04W 4/06* (2009.01)

(52) U.S. Cl.
CPC .................... *H04W 4/06* (2013.01)

(58) Field of Classification Search
CPC ............... H04W 4/06; H04W 80/08
USPC ........................................ 370/312
See application file for complete search history.

(56) References Cited

U.S. PATENT DOCUMENTS

| | | | |
|---|---|---|---|
| 8,774,130 B2 | 7/2014 | Jung et al. | |
| 2004/0185845 A1* | 9/2004 | Abhishek | H04W 12/069 455/422.1 |
| 2006/0114903 A1* | 6/2006 | Duffy, IV | H04L 12/1854 370/432 |
| 2014/0029580 A1 | 1/2014 | Jung et al. | |
| 2016/0249259 A1 | 8/2016 | Park et al. | |

FOREIGN PATENT DOCUMENTS

| | | |
|---|---|---|
| CN | 101605300 A | 12/2009 |
| CN | 101677266 A | 3/2010 |
| CN | 101689922 A | 3/2010 |
| CN | 101754111 A | 6/2010 |
| CN | 102113373 A | 6/2011 |
| CN | 102334358 A | 1/2012 |

(Continued)

OTHER PUBLICATIONS

Nokia, Nokia Siemens Networks, On MBMS service continuity. 3GPP TSG-RAN WG2 Meeting #60, Jeju, Korea, Nov. 5-9, 2007, R2-074853, 6 pages.

(Continued)

*Primary Examiner* — Mang Hang Yeung
(74) *Attorney, Agent, or Firm* — HAUPTMAN HAM, LLP

(57) ABSTRACT

This application provides a communication method and a related apparatus, which are applied to the multicast field, and in particular, relate to a multimedia broadcast multicast service MBMS. In this method, a terminal device receives, from a target base station to which the terminal device is handed over, at least one first data packet that is of a first service and that is sent in a transmission mode, and receives first indication information from the first base station. The terminal device sends a part of or all data packets in the at least one first data packet to an upper layer entity of the terminal device based on the first indication information.

20 Claims, 10 Drawing Sheets

(56) References Cited

FOREIGN PATENT DOCUMENTS

| | | | |
|---|---|---|---|
| CN | 102714835 | A | 10/2012 |
| CN | 103518351 | A | 1/2014 |
| CN | 104303550 | A | 1/2015 |
| CN | 105009638 | A | 10/2015 |
| CN | 105530667 | A | 4/2016 |
| CN | 109121168 | A | 1/2019 |
| JP | 2011004415 | A | 1/2011 |
| WO | 2019165427 | A1 | 8/2019 |

OTHER PUBLICATIONS

Huawei, MBMS Service Continuity. 3GPP TSG RAN WG3 Meeting #59 , Sorrento, Italy, Feb. 11, 15, 2008, R3-080247, 2 pages.
LG Electronics Inc., Handover for MBMS service continuity. 3GPP TSG-RAN WG2 #74, Barcelona, Spain, May 9, 13, 2011, R2-113338, 3 pages.
Chinese Office Action issued in corresponding Chinese Application No. 201980102570.2, dated Oct. 31, 2022, pp. 1-48.
3GPP TS 36.300 V15.7.0 (Sep. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15), 365 pages.
Extended European Search Report issued in corresponding European Application No. 19958709.8, dated Nov. 11, 2022, pp. 1-10.

\* cited by examiner

MULTICAST SENDING AND RECEIVING METHOD AND APPARATUS

CROSS-REFERENCE TO RELATED APPLICATIONS

This application is a continuation of International Application No. PCT/CN2019/130452, filed on Dec. 31, 2019, the disclosure of which is hereby incorporated by reference in its entirety.

TECHNICAL FIELD

This application relates to the field of communication technologies, and in particular, to a broadcast/multicast service transmission technology.

BACKGROUND

Currently, a wireless communication system has been widely applied to people's daily life. Specifically, the wireless communication system may provide a user with various services such as a telephone service, a voice service, a video service, a data service, and a reception and sending service, so that the user can handle various transactions in daily life, work, and study without leaving home. This greatly improves convenience for the user to handle the transactions and improves user experience.

The wireless communication system includes at least one core network device and at least one base station. A terminal device may be connected to the wireless communication system by accessing the base station, so that the user processes a service by using the terminal device and the wireless communication system. For example, related processing performed by the wireless communication system on a service may include: When the terminal device of the user processes a specific service, the core network device sends a data packet of the service to the base station, and the base station sends the received data packet of the service to the terminal device of the user, so that the terminal device of the user processes the service based on the data packet of the service.

In a current technology, downlink data transmission services provided by the wireless communication system for the terminal device may be generally classified into two types: a unicast service and a broadcast/multicast service.

Unicast refers to point-to-point communication, that is, single-point communication between a network device and a terminal device. The network device may send data for each terminal device to provide a personalized service. However, when a quantity of terminal devices is large and access traffic of the terminal device is heavy, if a unicast data transmission mode is used for all the terminal devices, a large quantity of dedicated bearers need to be established for the terminal devices. Consequently, excessive resources are consumed, and the network device is overloaded.

Broadcast/multicast can support point-to-multipoint communication, that is, a network device transmits same data to a plurality of terminal devices. A broadcast/multicast service may be, for example, a mobile television service. Broadcast is the most common form. In a broadcast data transmission mode, all terminal devices located in a local area network receive data, and path selection does not need to be performed for broadcast. Therefore, network costs are low, but a personalized service cannot be provided for a plurality of terminal devices that receive the data. However, multicast is to transmit data to a group of terminal devices that are interested in a same service, and terminal devices that need a same data flow may share the data flow. This provides more abundant services than broadcast while reducing load of the network device. Currently, if a plurality of terminal devices are interested in a same service, these terminal devices need to use a same group radio network temporary identifier (group radio network temporary identifier, G-RNTI) to receive the service.

For a same terminal device, it is assumed that a multicast service is received from a source base station at a specific moment. However, when a user location or communication quality changes, the terminal device of a user is handed over from the source base station to a target base station. After the handover is completed, the target base station needs to continue to process the service related to the terminal device. In these scenarios, how to ensure service continuity is a technical problem that needs to be resolved currently.

SUMMARY

Embodiments of this application provide a communication method and apparatus, to ensure continuity of a multicast service. In particular, this application relates to multicast transmission in a handover scenario.

According to a first aspect, a communication method is provided. The method includes:

A first base station sends at least one data packet of a first service to a terminal device. The terminal device receives, from the first base station, at least one first data packet that is of the first service and that is sent in a multicast transmission mode; receives first indication information from the first base station; and sends a part of or all data packets in the at least one first data packet to an upper layer entity of the terminal device based on the first indication information. The first base station herein may be a target base station. Optionally, the terminal device is handed over from a second base station (namely, a source base station) to the first base station. The first base station and the second base station each may provide a multicast transmission service of the first service.

According to the foregoing communication method, the first base station sends the indication information to the terminal device, to indicate transmission of the terminal device to the upper layer entity. For example, the indication information indicates a specific data packet that is in the at least one data packet received from the target base station and that needs to be sent or delivered to the upper layer entity by an RLC layer entity, a PDCP layer entity, or another layer 2 protocol layer entity of the terminal device, and indicates a sending or delivery sequence. In this way, service interruption or service redundancy on a terminal device side caused by service progress inconsistency between the source base station and the target base station due to handover can be avoided, and continuity of multicast communication is ensured.

In a possible implementation, the terminal device receives, from the target base station, at least one second data packet that is of the first service and that is sent in a unicast transmission mode. The sending a part of or all data packets in the at least one first data packet to an upper layer entity based on the first indication information includes: sending the at least one first data packet and the at least one second data packet to the upper layer entity based on the first indication information. In this manner, the first base station sends the at least one second data packet to the terminal device in the unicast transmission mode, to ensure that the terminal device can receive the at least one second data packet and that the at least one second data packet is not repeatedly received by another terminal device that is receiving the multicast data packet, so that interference to the another terminal device is reduced, and communication performance is improved.

In an optional manner, the first indication information is for indicating that transmission of the at least one second data packet is completed; or the first indication information is for indicating to release a bearer used for the at least one second data packet; or the first indication information is for indicating to deactivate unicast transmission of the at least one second data packet. In this optional design, the terminal device does not need to receive and obtain additional information, can quickly determine that the transmission of the at least one second data packet is completed, and further perform a subsequent operation, so that service processing efficiency is improved.

Specifically, the first indication information may be a dedicated data packet or a control data packet. The control data packet may be a control PDU, for example, an end-marker PDU. Alternatively, the first indication information may be carried in physical layer signaling (for example, downlink control information DCI) or higher layer signaling (for example, RRC signaling or a MAC CE).

Further, optionally, the sending the at least one first data packet and the at least one second data packet to the upper layer entity based on the first indication information includes: sending the at least one first data packet to the upper layer entity after receiving the first indication information and sending the at least one second data packet to the upper layer entity, where
  the at least one first data packet is sent in ascending order of a sequence number of the at least one first data packet, and the at least one second data packet is sent in ascending order of a sequence number of the at least one second data packet. In this way, disorder of data packets can be avoided, and service processing performance can be improved.

In another optional manner, the first indication information includes or indicates: a first sequence number, where the first sequence number is a largest sequence number in a sequence number of the at least one second data packet; or a first sequence number and second indication information, where the second indication information is for indicating that the first sequence number is a largest sequence number in a sequence number of the at least one second data packet. In this design, the terminal device may obtain identification information of the data packet, and accurately determine a part of or all data packets that are in the at least one second data packet and that need to be first delivered to the upper layer entity, so that the terminal device is not affected by disorder and a latency in actual transmission of the indication information and the data packet, and service processing performance is improved.

Further, optionally, the sending the at least one first data packet and the at least one second data packet to the upper layer entity based on the first indication information includes: sending the at least one first data packet to the upper layer entity after sending, to the upper layer entity, a data packet that is in the at least one second data packet and whose sequence number is less than or equal to the first sequence number.

In this possible implementation, the at least one first data packet is received by using a first bearer, and the at least one second data packet is received by using a second bearer, where the first bearer is the same as or different from the second bearer.

In another possible implementation, the first indication information is for indicating that a data packet to be sent to the upper layer entity is a data packet that is in the at least one first data packet and whose receiving moment is later than a receiving moment of the first indication information.

Further, optionally, the sending a part of or all data packets in the at least one first data packet to an upper layer entity based on the first indication information includes:
  sending, to the upper layer entity in ascending order of a sequence number of the data packet, the data packet that is in the at least one first data packet and whose receiving moment is later than the receiving moment of the first indication information.

In still another possible implementation, the first indication information includes or indicates a second sequence number.

Further, optionally, the sending a part of or all data packets in the at least one first data packet to an upper layer entity based on the first indication information includes:
  sending, to the upper layer entity, a data packet that is in the at least one first data packet and whose sequence number is greater than the second sequence number; or sending, to the upper layer entity, a data packet that is in the at least one first data packet and whose sequence number is not less than the second sequence number.

Further, if the data packet that is in the at least one first data packet and whose sequence number is greater than the second sequence number is sent to the upper layer entity, a data packet that is in the at least one first data packet and whose sequence number is not greater than the second sequence number is discarded. Alternatively, if the data packet that is in the at least one first data packet and whose sequence number is not less than the second sequence number is sent to the upper layer entity, a data packet that is in the at least one first data packet and whose sequence number is less than the second sequence number is discarded.

Optionally, the sending, to the upper layer entity, a data packet that is in the at least one first data packet and whose sequence number is greater than the second sequence number or the sending, to the upper layer entity, a data packet that is in the at least one first data packet and whose sequence number is not less than the second sequence number includes: sending the data packet in the at least one first data packet to the upper layer entity in ascending order of a sequence number of the data packet.

According to a second aspect, a communication method is provided. The method includes:

A first base station sends at least one data packet of a first service and first indication information to a terminal device, where the first indication information is for indicating transmission that is of the terminal device and that corresponds to a part of or all data packets in the at least one data packet. The terminal device receives the at least one data packet, and delivers a corresponding data packet to an upper layer entity based on the first indication information.

According to the foregoing communication method, the first base station sends the indication information to the terminal device, to indicate transmission of the terminal device to the upper layer entity. For example, the indication information indicates a specific data packet that is in the at least one data packet received from the target base station and that needs to be sent or delivered to the upper layer entity by an RLC layer entity, a PDCP layer entity, or another layer 2 protocol layer entity of the terminal device, and indicates a sending or delivery sequence. In this way, service interruption or service redundancy on a terminal device side caused by service progress inconsistency between a source base station and the target base station due to handover can be avoided, and continuity of multicast communication is ensured.

In a possible implementation, the at least one data packet is at least one first data packet sent in a multicast transmission mode.

For example, the first indication information is for indicating a part of or all data packets that are in the at least one first data packet and whose receiving moments are later than a receiving moment of the first indication information. Further, the part of or all the data packets in the at least one data packet are data packets that are in the at least one first data packet and whose receiving moments are later than the receiving moment of the first indication information.

For another example, the first indication information indicates or includes a second sequence number, and the second sequence number is a smallest sequence number in sequence numbers of a part of or all data packets in the at least one first data packet, or the second sequence number is a largest sequence number in a sequence number of a data packet other than a part of data packets in the at least one first data packet.

In another possible implementation, the at least one data packet is at least one second data packet sent in a unicast transmission mode, and the first indication information is for indicating a part of or all data packets in the at least one second data packet.

Further, optionally, the first base station sends at least one first data packet of the first service to the terminal device in a multicast transmission mode, where the first indication information is for indicating transmission that is of the terminal device and that corresponds to the at least one first data packet and the at least one second data packet.

In an optional manner, the first indication information is for indicating that transmission of the at least one second data packet is completed; or the first indication information is for indicating to release a bearer used for the at least one second data packet; or the first indication information is for indicating to deactivate unicast transmission of the at least one second data packet.

Further, transmission that is of the terminal device and that corresponds to a part of or all data packets in the at least one first data packet and the at least one second data packet includes: For the terminal device, transmission corresponding to the at least one first data packet is performed after transmission corresponding to the at least one second data packet.

In another optional manner, the first indication information includes a first sequence number, where the first sequence number is a largest sequence number in a sequence number of the at least one second data packet; or the first indication information includes a first sequence number and second indication information, where the second indication information is for indicating that the first sequence number is a largest sequence number in a sequence number of the at least one second data packet.

Further, optionally, transmission that is of the terminal device and that corresponds to a part of or all data packets in the at least one first data packet and the at least one second data packet includes: For the terminal device, transmission corresponding to the at least one first data packet is performed after transmission corresponding to a data packet that is in the at least one second data packet and whose sequence number is less than or equal to the first sequence number.

In this possible implementation, the at least one first data packet is sent by using a first bearer, and the at least one second data packet is sent by using a second bearer. Further, the method further includes:

sending third indication information to the terminal device, where the third indication information is for indicating that the first bearer is associated with the second bearer, or the third indication information is for indicating that the first bearer and the second bearer correspond to the first service.

According to a third aspect, a communication apparatus is provided. The communication apparatus may be a terminal device or a chip in the terminal device.

In a possible design, the communication apparatus includes a receiving unit. Further, optionally, the communication apparatus further includes a processing unit and/or a sending unit. The receiving unit is configured to receive, from a first base station, at least one first data packet that is of a first service and that is sent in a multicast transmission mode. The receiving unit is further configured to receive first indication information from the first base station. Further, the sending unit is configured to send a part of or all data packets in the at least one first data packet to an upper layer entity of a terminal device based on the first indication information. Alternatively, the processing unit is configured to send a part of or all data packets in the at least one first data packet to an upper layer entity of a terminal device based on the first indication information. Further, optionally, each functional unit in the communication apparatus is configured to implement a corresponding function in the communication method disclosed in any one of the first aspect or the possible implementations of the first aspect.

Herein, it should be noted that the foregoing step of "sending a part of or all data packets in the at least one first data packet to an upper layer entity of a terminal device" may be performed by a logical functional unit or a logical entity. For example, the logical functional unit or the logical entity is a PDCP entity, an RLC entity, or another possible layer 2 entity. For another example, the logical functional unit or the logical entity is the sending unit or the processing unit. However, the logical functional unit or the logical entity is not limited to the sending unit having a sending function or the processing unit having a processing function. Both the sending unit and the processing unit herein may be understood as logical functional units, and hardware structures are not limited.

In another possible design, the communication apparatus includes at least one processor and at least one memory. The processor is configured to support the apparatus in performing a corresponding function in the communication method disclosed in any one of the first aspect or the possible implementations of the first aspect. Optionally, the processor and the memory may include any one or more processors (for example, baseband processors) and memories that are provided in FIG. 3. Further, optionally, the at least one processor further includes at least one control node or controller. The at least one memory is configured to be coupled to the at least one processor, and stores a program (instructions) and/or data that are/is necessary for the apparatus. Further, the at least one processor may include at least one of a central processing unit (central processing unit, CPU), a neural network processing unit (neural network processing unit, NPU), or another processor that performs functions of processing and delivering data packets. Further, optionally, the memory may be a random access memory (Random Access Memory, RAM), a read-only memory (read-only memory, ROM), or another memory that performs functions of storing and delivering data packets or instructions. Herein, it should be noted that the foregoing step of "sending a part of or all data packets in the at least one first data packet to an upper layer entity of a terminal device" may be implemented by the at least one processor by executing a corresponding program (instruction). Therefore, from a perspective of a hardware structure, execution of the foregoing sending step may be controlled by the at least one processor. For example, the at least one processor controls, based on the instruction, to transfer data from a first memory to a second memory, where the first memory herein may correspond to at least one layer 2 entity and is configured to store data or information of the at least one layer 2 entity, and the second memory corresponds to the upper layer entity and is configured to store data or information of the upper layer entity. For another example, the at least one processor transfers data from a first storage resource of a memory to a second storage resource, where the first storage resource herein may correspond to at least one layer 2 entity and is for storing data or information of the at least one layer 2 entity, and the second storage resource corresponds to the upper layer entity and is for storing data or information of the upper layer entity. Optionally, the communication apparatus may further include a communication interface, configured to support communication between the apparatus and another network element. Specific types of the processor and the memory are not specifically limited in this application.

In still another possible design, the communication apparatus may include a unit or module for performing a corresponding function or action in the communication method disclosed in any one of the first aspect or the possible implementations of the first aspect.

In still another possible design, the communication apparatus includes at least one processor and a transceiver apparatus. The at least one processor is coupled to the transceiver apparatus, and is configured to execute a computer program or instructions, to control the transceiver apparatus to perform information receiving and sending. When the at least one processor executes the computer program or the instructions, the communication apparatus implements the communication method disclosed in any one of the first aspect or the possible implementations of the first aspect. For example, the transceiver apparatus may be a transceiver, a transceiver circuit, or an input/output interface. When the communication apparatus is the chip, the transceiver apparatus is a transceiver circuit or an input/output interface. Herein, it should be noted that the foregoing step of "sending a part of or all data packets in the at least one first data packet to an upper layer entity of a terminal device" may be implemented by the at least one processor by executing a corresponding program (instruction), or may be implemented by the transceiver apparatus. Therefore, from a perspective of a hardware structure, the foregoing sending step may be performed by the at least one processor or the transceiver apparatus.

According to a fourth aspect, a communication apparatus is provided. The communication apparatus may be a network device, for example, a gNB or an access point, or may be a chip in the network device.

In a possible implementation, the communication apparatus includes a sending unit. Further, optionally, the communication apparatus further includes a processing unit and/or a receiving unit. The sending unit is configured to send at least one data packet of a first service to a terminal device. The sending unit is further configured to send first indication information to the terminal device, where the first indication information is for indicating transmission that is of the terminal device and that corresponds to a part of or all data packets in the at least one data packet. Further, optionally, each functional unit in the communication apparatus is configured to implement a corresponding function in the communication method disclosed in any one of the second aspect or the possible implementations of the second aspect.

In another possible implementation, the communication apparatus includes at least one processor and at least one memory. The at least one processor is configured to support the apparatus in performing a corresponding function in the communication method disclosed in any one of the second aspect or the possible implementations of the second aspect. The at least one memory is configured to be coupled to the at least one processor, and stores a program (instructions) and data that are necessary for the apparatus. Optionally, the communication apparatus may further include a communication interface, configured to support communication between the apparatus and another network element.

In still another possible implementation, the communication apparatus may include a unit or module for performing a corresponding action in the communication method disclosed in any one of the second aspect or the possible implementations of the second aspect.

In yet another possible implementation, the network device includes at least one processor and a transceiver apparatus. The at least one processor is coupled to the transceiver apparatus, and is configured to execute a computer program or instructions, to control the transceiver apparatus to perform information receiving and sending. When the at least one processor executes the computer program or the instructions, the at least one processor is further configured to implement the foregoing method. For example, the transceiver apparatus may be a transceiver, a transceiver circuit, or an input/output interface. When the communication apparatus is the chip, the transceiver apparatus is a transceiver circuit or an input/output interface.

According to a fifth aspect, this application provides a computer-readable storage medium. The computer-readable storage medium stores a computer program. When the program is executed by a processor, the method according to any one of the first aspect or the possible implementations of the first aspect is implemented.

According to a sixth aspect, this application provides a computer-readable storage medium. The computer-readable storage medium stores a computer program. When the program is executed by a processor, the method according to any one of the second aspect or the possible implementations of the second aspect is implemented.

According to a seventh aspect, a computer program product including instructions is provided. When the computer program product runs on a computer, the computer is enabled to perform the method according to any one of the first aspect or the possible implementations of the first aspect, or the computer is enabled to perform the method according to any one of the second aspect or the possible implementations of the second aspect All or a part of the computer program product may be stored in a storage medium encapsulated in the processor, or may be stored in a storage medium encapsulated outside the processor.

According to an eighth aspect, a communication apparatus is provided. The apparatus is configured to implement the method according to any one of the first aspect or the possible implementations of the first aspect.

According to a ninth aspect, a communication apparatus is provided. The apparatus is configured to implement the method according to any one of the second aspect or the possible implementations of the second aspect.

According to a tenth aspect, a communication system is provided. The system includes any one of the foregoing network devices and/or any one of the foregoing terminal devices.

The communication methods and apparatuses provided in this application can be used to ensure continuity of a multicast service. In particular, during multicast transmission in a handover scenario, a terminal device is handed over from a source base station to a target base station, and can still receive a previous service without interruption, so that service processing performance is ensured, and robustness of a communication system is improved.

BRIEF DESCRIPTION OF DRAWINGS

The following briefly describes the accompanying drawings used in embodiments or a current technology.

DETAILED DESCRIPTION OF EMBODIMENTS

A network architecture and a service scenario described in embodiments of the present invention are intended to describe technical solutions of embodiments of the present invention more clearly, and do not constitute a limitation on the technical solutions provided in embodiments of the present invention. A person of ordinary skill in the art may know: With evolution of the network architecture and emergence of new service scenarios, the technical solutions provided in embodiments of the present invention are also applicable to similar technical problems.

In embodiments of the present invention, "a plurality of" means two or more than two. The term "and/or" describes an association relationship for describing associated objects and represents that three relationships may exist. For example, A and/or B may represent the following three cases: Only A exists, both A and B exist, and only B exists. The character "I" generally represents an "or" relationship between the associated objects.

Figure 1:
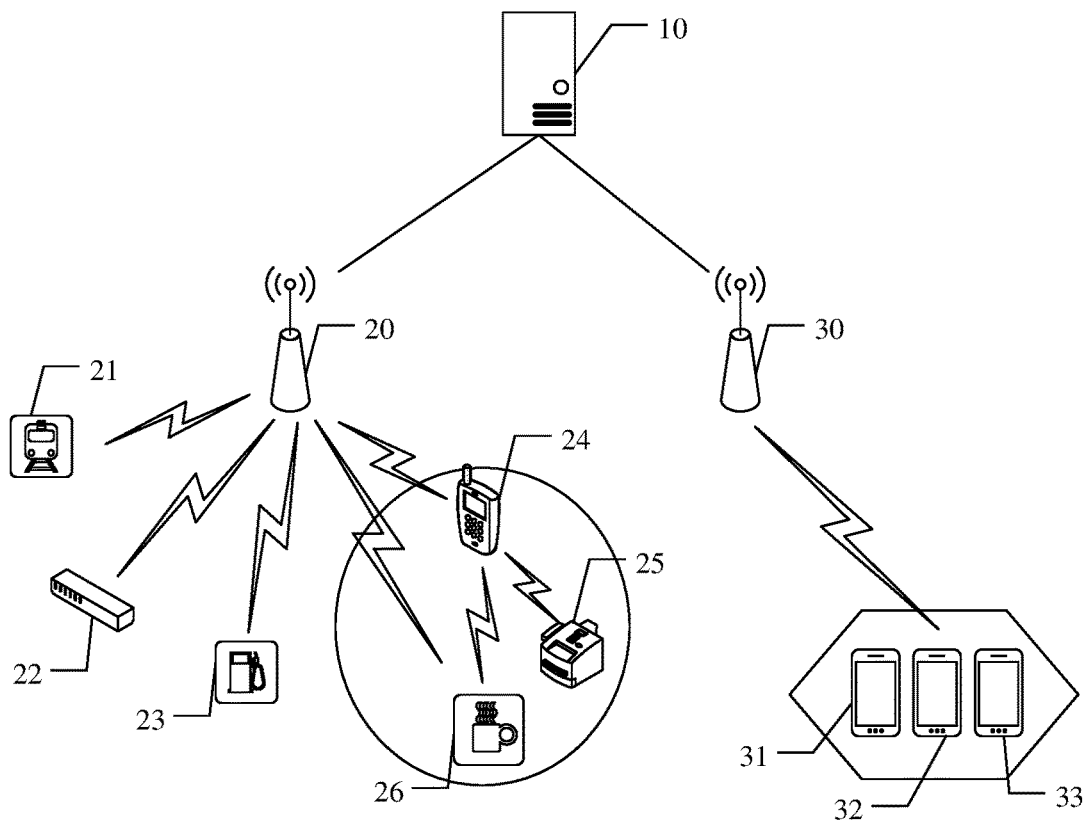
FIG. 1 is a schematic diagram of a possible application scenario according to an embodiment of this application.

FIG. 1 is a schematic diagram of a possible application scenario according to an embodiment of this application. A communication system in the application scenario includes a network device and one or more terminal devices. The network device may communicate with the terminal devices by using one or more air interface technologies.

It can be learned from FIG. 1 that the application scenario includes a core network device 10, network devices 20 and 30, and terminal devices 21 to 26 and 31 to 33. The terminal devices 21 to 26 are connected to the network device 20, and the terminal devices 31 to 33 are connected to the network device 30.

In addition, the terminal devices 24 to 26 may constitute a communication system. Based on this, the network device 20 may send downlink data to the terminal devices 21 to 23 and the terminal device 24, and the terminal device 24 may send the downlink data to the terminal devices 25 and 26. The terminal devices 31 to 33 may send uplink data to the network device 30, and the network device 30 may send downlink data to the terminal devices 31 to 33.

The core network device 10 receives a data packet of a service from a data server or a data network. Specifically, for a plurality of services, links or session connections (which are represented by links in the following descriptions) between the core network device 10 and data servers or data networks of various services are first separately established, and then a data server or a data network of each service sends a data packet to the core network device 10 through a corresponding link. The core network device 10 receives the data packet of the corresponding service on the corresponding link.

The core network device 10 sends a data packet of a specific service to the network device. Specifically, for at least one service and one network device, a link is first established between the core network device 10 and the network device for each of the at least one service, and then the core network device 10 sends a data packet of the corresponding service to the network device through the link of each service. It should be noted that, because a same principle is used for the core network device 10 to send a data packet of at least one service to each network device, a case of at least one service and a plurality of network devices is not described herein.

As shown in FIG. 1, if a data packet of a service is to be sent to the network devices 20 and 30, a first link of the service needs to be established between the core network device 10 and the network device 20, and a second link of the service needs to be established between the core network device 10 and the network device 30, and then the core network device 10 sends the data packet of the service to the network device 20 through the first link and sends the data packet of the service to the network device 30 through the second link. If both a data packet of a first service and a data packet of a second service are to be sent to the network device 20, a link of the first service is established between the core network device 10 and the network device 20, and a link of the second service is established between the core network device 10 and the network device 20, and then the core network device 10 sends the data packet of the first service to the network device 20 through the link of the first service and sends the data packet of the second service to the network device 20 through the link of the second service. If a data packet of a first service is to be sent to the network device 20 and a data packet of a second service is to be sent to the network device 30, a link of the first service is established between the core network device 10 and the network device 20, and a link of the second service is established between the core network device 10 and the network device 30, and then the core network device 10 sends the data packet of the first service to the network device 20 through the link of the first service and sends the data packet of the second service to the network device 30 through the link of the second service.

The network device may send downlink data to the terminal device, where the downlink data includes a data packet for a service. The network device may send the downlink data to the terminal device in two manners. In a first manner, the network device may send the downlink data to the terminal device in a unicast mode. In a second manner, the network device may send the downlink data to the terminal device in a multicast (or multicast) mode.

Specifically, if the downlink data is sent to the terminal device in the unicast mode, when the network device sends a data packet of a specific service to a plurality of terminal devices, a dedicated bearer or a dedicated connection between each terminal device and the network device needs to be established based on the service, so that each terminal device receives the data packet of the service from the network device by using the dedicated bearer corresponding to the terminal device. If the network device sends data packets of a plurality of services to a same terminal device, one or more dedicated bearers between the terminal device and the network device need to be established based on each service.

If the downlink data is sent to the terminal device in the multicast mode, when the network device sends a data packet of a specific service (that is, the downlink data) to at least one terminal device, there is no need to establish a dedicated bearer or connection for each terminal device, so that the at least one terminal device may receive the data packet of the service from the network device by using a unified bearer or unified configuration information.

As shown in FIG. 1, the network device 20 may send downlink data to the terminal devices 21 to 23 in the unicast mode, and the network device 20 may send downlink data to the terminal device 24 and the terminal device 26 in the unicast mode. The terminal device 24 may send data to the terminal devices 25 and 26 in the multicast mode or in a device-to-device (Device-to-Device, D2D) communication mode. The network device 30 may send downlink data to the terminal devices 31 to 33 in the multicast mode.

In addition, the terminal devices 21 to 26 may send uplink data to the network device 20, and the terminal devices 31 to 33 may send uplink data to the network device 30.

A service supported by a network device may be determined based on an ongoing service of a terminal device connected to the network device. A service supported by a core network device may be determined based on a service supported by a network device connected to the core network device.

The terminal device may be, for example, a mobile phone, a computer, an e-reader, a printer, intelligent kitchenware, a speaker, or a vehicle with information receiving and sending functions. This is not specifically limited in this application. The core network device may be, for example, an access and mobility management function (Access and Mobility Management Function, AMF), a service management function (Service Management Function, SMF), or a user port function (User Port Function, UPF). This is not specifically limited herein.

The following explains terms that may appear in embodiments of the present invention.

Communication system: The communication system may be a 5th generation (5th generation, 5G) communication system, or other wireless communication systems that use various radio access technologies, for example, systems that use access technologies such as code division multiple access, frequency division multiple access, time division multiple access, orthogonal frequency division multiple access, and single carrier frequency division multiple access. In addition, the communication system may alternatively be a subsequent evolved system, for example, a 6th generation 6G communication system or even a more advanced 7th generation 7G communication system.

Network device: The network device may be a base station, an access point, an access network device, or a device that is in an access network and that communicates with a wireless terminal through one or more sectors over an air interface. The network device may be configured to mutually convert a received over-the-air frame and an IP packet and serve as a router between the wireless terminal and the remaining part of the access network, where the remaining part of the access network may include an internet protocol (IP) network. The network device may further coordinate attribute management of the air interface. For example, the network device may be a base transceiver station (Base Transceiver Station, BTS) in a global system for mobile communications (Global System for Mobile communications, GSM) or a code division multiple access (Code Division Multiple Access, CDMA) system, may be a NodeB (NodeB, NB) in a wideband code division multiple access (Wideband Code Division Multiple Access, WCDMA) system, or may be a base station in a 5G network, for example, a gNB, or a base station in a subsequent 6G or 7G network. This is not limited herein. It should be noted that, in a 5G system, there may be one or more transmission reception points (Transmission Reception Points, TRPs) on one base station. All TRPs belong to a same cell, and each TRP and each terminal can use a measurement reporting method described in embodiments of this application. In another scenario, the network device may be further divided into a control unit (Control Unit, CU) and a data unit (Data Unit, DU). One CU may correspond to a plurality of DUs. Each DU and each terminal can use the measurement reporting method described in embodiments of this application. A difference between a CU-DU split scenario and a multi-TRP scenario lies in: The TRP is merely a radio frequency unit or an antenna device while the DU can implement a protocol stack function, for example, a physical layer function.

Terminal device: The terminal device may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal, for example, a mobile phone (which is also referred to as a "cellular" phone) or a computer having a mobile terminal, for example, may be a portable, pocket-sized, handheld, computer built-in, or in-vehicle mobile apparatus, which exchanges a voice and/or data with the radio access network. For example, the wireless terminal may be a device, for example, a personal communication service (Personal Communication Service, PCS) phone, a cordless phone, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), a user device (User Device or User Equipment). This is not limited herein.

Unicast: Unicast refers to a point-to-point communication technology, that is, single-point communication between a network device and a terminal device. The network device may send data to each terminal device. Unicast may also be referred to as a unicast transmission mode or a unicast transmission technology.

That sending is performed in the unicast (unicast) transmission mode means: When sending a transport block (transport block, TB) corresponding to a protocol data unit (protocol data unit, PDU), a sending apparatus scrambles the PDU or downlink control information (downlink control information, DCI) corresponding to the PDU by using a cell radio network temporary identifier (cell radio network temporary identifier, C-RNTI), and a receiving apparatus receives the same PDU based on the C-RNTI. Alternatively, that a PDU is transmitted in the unicast mode may mean: The PDU is transmitted on a radio bearer established for unicast transmission or on a channel specially designed for unicast.

That receiving is performed in the unicast transmission mode means: When sending is performed in the unicast mode, the receiving apparatus receives the PDU based on the C-RNTI, or the receiving apparatus receives the PDU on the radio bearer established for unicast transmission or on the channel used for unicast transmission.

Multicast: Multicast refers to a point-to-multipoint communication technology, may also be referred to as a multicast transmission mode or a multicast transmission technology, and is used to serve a multimedia broadcast multicast service (multimedia broadcast multicast service, MBMS). Multicast may also be referred to as multicast, and may also be referred to as a broadcast technology in some generalized scenarios. However, multicast is different from a conventional broadcast technology. When the multicast transmission mode is used, a plurality of terminal devices simultaneously receive same data in a process in which a network device (for example, a base station) sends the data. Currently, multicast transmission technologies are mainly classified into two types: a multimedia broadcast multicast service single frequency network (multimedia broadcast multicast service single frequency network, MBSFN) service and a single cell point to multipoint (single cell point to multipoint, SC-PTM) service. In addition, another multicast transmission technology is also discussed. This is not limited in the present invention.

That sending is performed in the multicast (multicast) transmission mode means: When sending a transport block (transport block, TB) corresponding to a protocol data unit (protocol data unit, PDU), a sending apparatus scrambles the PDU or downlink control information (downlink control information, DCI) corresponding to the PDU by using a group radio network temporary identifier (group radio network temporary identifier, G-RNTI), and one or more receiving apparatuses receive the same PDU based on the same G-RNTI. Alternatively, that a PDU is transmitted in the multicast mode may mean: A location of a same PDU is notified to a plurality of receiving apparatuses in a semi-persistent manner, and the plurality of receiving apparatuses may simultaneously receive the PDU. Alternatively, that a PDU is transmitted in the multicast mode may mean: The PDU is transmitted on a radio bearer established for multicast transmission or on a channel specially designed for multicast.

That receiving is performed in the multicast transmission mode means: When sending is performed by a peer side in the multicast mode, one of the plurality of receiving apparatuses receives the PDU based on the G-RNTI, or one of the plurality of receiving apparatuses receives the PDU on the radio bearer established for multicast transmission or on the channel used for multicast transmission.

Broadcast: Broadcast refers to a point-to-multipoint communication technology. Different from multicast, the technology related to broadcast is: A sending apparatus sends a TB corresponding to a PDU on a broadcast channel, and all receiving apparatuses may receive the PDU on the broadcast channel. Different from the multicast technology, in conventional broadcast transmission, the foregoing scrambling manner using the G-RNTI is not used for the broadcast channel.

Handover (handover, HO): An ongoing call is handed over from a wireless channel to another wireless channel, to ensure that communication is not interrupted. In a wireless communication system, each cell covers a limited range. Therefore, when a terminal device moves from a current serving cell to a neighboring cell, to ensure service continuity, a network side needs to hand over a service to the neighboring cell, so that a communication process is not interrupted. Handover is a process in which a link carrying communication data is handed over from a cell (or a base station) to another cell (or another base station) in a communication process, to ensure that communication is not interrupted.

Protocol stack (Protocol Stack): A network device and a terminal device have specific protocol layer structures that are used for mutual communication. For example, a control plane protocol layer structure may include a radio resource control (radio resource control, RRC) layer, a packet data convergence protocol (Packet Data Convergence Protocol, PDCP) layer, a radio link control (radio link control, RLC) layer, a media access control (media access control, MAC) layer, and a physical layer. A user plane protocol layer structure may include a PDCP layer, an RLC layer, a MAC layer, a physical layer, and the like. The physical layer is located at the lowest layer (layer 1), the MAC layer, the RLC layer, and the PDCP layer belong to the second layer (layer 2), and the RRC layer belongs to the third layer (layer 3). In an implementation, a service data adaptation protocol (service data adaptation protocol, SDAP) layer may be further included above the PDCP layer. In addition, a transport layer and an application layer, for example, a transmission control protocol/internet protocol (Transmission Control Protocol/Internet Protocol, TCP/IP) layer, may further exist above the SDAP layer.

Functions of these protocol layers may be implemented by one node, or may be implemented by a plurality of nodes. For example, in an evolved structure, a radio access network device may include a centralized unit (centralized unit, CU) and a distributed unit (distributed unit, DU). A plurality of DUs may be centrally controlled by one CU. The CU and the DU may be obtained through division based on a protocol layer of a wireless network. For example, functions of the PDCP layer and a layer above the PDCP layer are set on the CU, and functions of protocol layers below the PDCP layer, such as the RLC layer and the MAC layer, are set on the DU.

It should be understood that division based on the protocol layer is merely an example, and division may alternatively be performed based on another protocol layer. For example, division is performed based on the RLC layer. In this case, functions of the RLC layer and a layer above the RLC layer are set on the CU, and a function of a protocol layer below the RLC layer is set on the DU. Alternatively, division is performed at a protocol layer. For example, a part of functions of the RLC layer and a function of a protocol layer above the RLC layer are set on the CU, and the remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

Radio bearer (Radio Bearer): Usually, the radio bearer may be understood as a transmission path or a treatment (treatment) used when a data packet or signaling is transmitted on an air interface. Radio bearers include a data radio bearer and a signaling radio bearer. The radio bearer is established and configured by using RRC signaling of a network device. A configuration of the radio bearer includes configurations of protocol layers. Protocol layer entities of the network device and a terminal device send, receive, or process the data packet or signaling on the radio bearer based on the configuration. Technically, the radio bearer may be understood as a transmission channel. Regardless of a terminal device side or a network device side, each radio bearer includes one PDCP entity and at least one RLC entity to process a data packet transmitted on the radio bearer. In addition to establishing the radio bearer, the network device may further add, modify, or delete (release) the radio bearer by using RRC signaling.

Multimedia broadcast multicast service: The multimedia broadcast multicast service is referred to as an MBMS for short. The MBMS is a point-to-multipoint unidirectional multimedia service. For example, a multimedia broadcast service is sent to a user in a cell through a common channel over an air interface, or a multicast service subscribed to by a user in a cell is sent to the user in a multicast mode, so that air interface resources are reduced.

Figure 2:
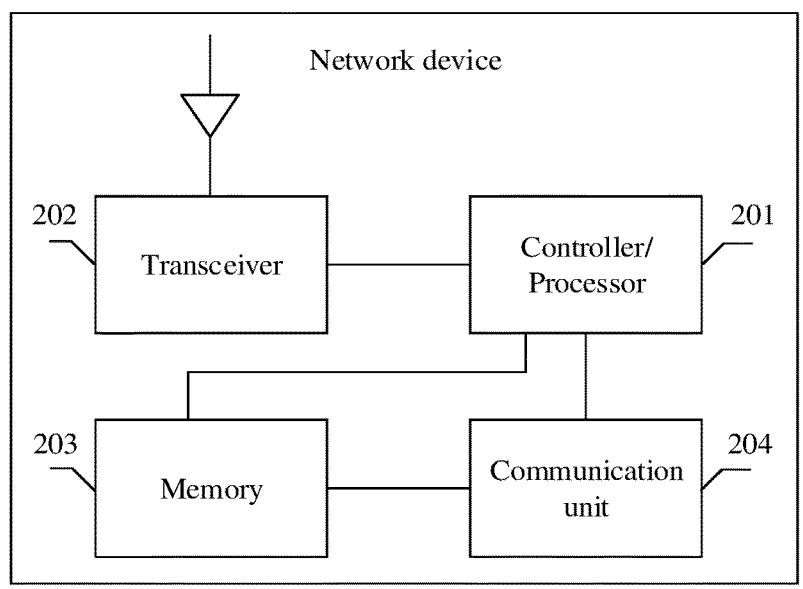
FIG. 2 is a schematic diagram of a possible structure of a network device according to an embodiment of this application.

Further, a schematic diagram of a possible structure of the foregoing network device may be shown in FIG. 2. A network device 102 can perform a method provided in embodiments of the present invention. The network device 102 may include a controller/processor 201 (where the processor 201 is used as an example for description below) and a transceiver 202. The controller/processor 201 may also be sometimes referred to as a modem processor (modem processor). The modem processor 201 may include a baseband processor (baseband processor, BBP) (not shown). The baseband processor processes a received digitalized signal, to extract information or a data bit transmitted in the signal. Therefore, based on a requirement or an expectation, the BBP is usually implemented in one or more digital signal processors (digital signal processors, DSPs) in the modem processor 201 or implemented as a separated integrated circuit (integrated circuit, IC).

The transceiver 202 may be configured to support information receiving and sending between the network device and a terminal device, and support radio communication between terminal devices. The processor 201 may be further configured to perform various functions for communication between the terminal device and another network device. On an uplink, an uplink signal from the terminal device is received through an antenna, demodulated by the transceiver 202, and further processed by the processor 201 to restore service data and/or signaling information sent by the terminal device. On a downlink, service data and/or a signaling message are/is processed by the terminal device, modulated by the transceiver 202 to generate a downlink signal, and transmitted to the terminal device through the antenna. The network device may further include a memory 203, and the memory 203 may be configured to store program code and/or data of the network device. The transceiver 202 may include an independent receiver circuit and an independent transmitter circuit, or may implement receiving and sending functions in one circuit. The network device may further include a communication unit 204, and the communication unit 204 is configured to support communication between the network device and another network entity. For example, the communication unit 204 is configured to support communication between the network device and a network device of a core network.

Optionally, the network device may further include a bus. The transceiver 202, the memory 203, and the communication unit 204 may be connected to the processor 201 by using the bus. For example, the bus may be a peripheral component interconnect (Peripheral Component Interconnect, PCI) bus, an extended industry standard architecture (Extended Industry Standard Architecture, EISA) bus, or the like. The bus may include an address bus, a data bus, a control bus, and the like.

Figure 3:
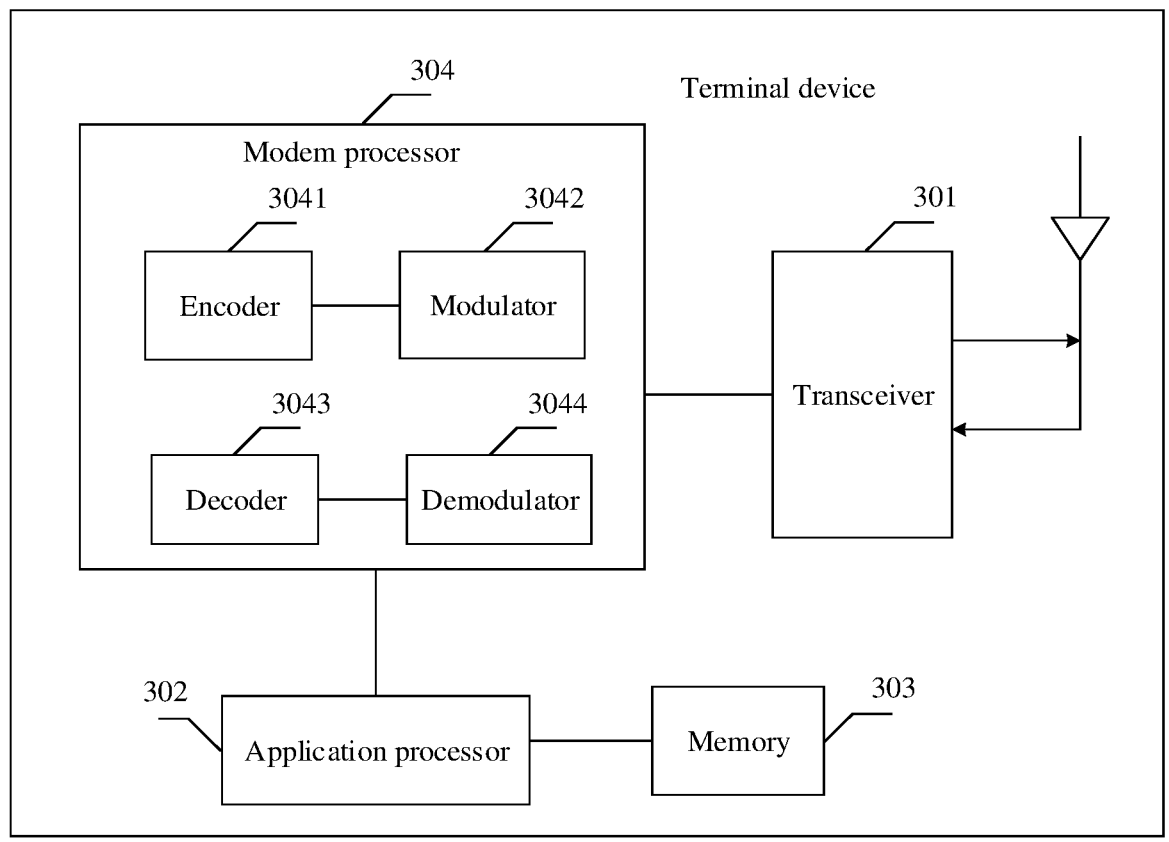
FIG. 3 is a schematic diagram of a possible structure of a terminal device according to an embodiment of this application.

FIG. 3 is a schematic diagram of a possible structure of the terminal device in the foregoing communication system. The terminal device can perform a method provided in embodiments of the present invention. The terminal device may be any one of the one or more terminal devices in FIG. 1. The terminal device includes a transceiver 301, an application processor (application processor) 302, a memory 303, and a modem processor (modem processor) 304.

The transmitter 301 may adjust (for example, perform analog conversion, filtering, amplification, and up-conversion on) an output sample and generate an uplink signal. The uplink signal is transmitted to the base station in the foregoing embodiment through an antenna. On a downlink, the antenna receives a downlink signal transmitted by a network device. The transceiver 301 may adjust (for example, perform filtering, amplification, down-conversion, and digitalization on) the signal received from the antenna and provide an input sample.

Herein, it should be noted that the transceiver is mainly responsible for receiving and sending between the terminal device and another external apparatus, for example, the network device or another terminal device. As described above, based on protocol stack division, there are a plurality of entities at different protocol layers inside the terminal device, for example, logical entities such as a PDCP entity and a MAC entity. The transceiver may be responsible for transmission between internal entity layers, or may not be responsible for transmission between internal entity layers. When the transceiver is not responsible for transmission between internal entity layers, transmission between entities at these different internal layers is performed by using corresponding logical entities or functional modules. Because transmission (for example, sending, receiving, or delivery) between entities at different internal layers of the terminal device is performed inside the terminal device, a logical entity or a functional module configured to perform the foregoing transmission function may be implemented by any one of the foregoing processors (for example, the modem processor 304) by executing a corresponding program, or may be implemented by a processor other than the foregoing processor by executing a corresponding program.

Further, optionally, specific transmission may be that data is transferred from storage space corresponding to a source layer entity to storage space of a destination layer entity. Optionally, the corresponding program may exist in any memory inside the terminal device or an external memory.

The modem processor 304 is sometimes referred to as a controller or processor, and may include a baseband processor (baseband processor, BBP) (not shown). The baseband processor processes a received digitalized signal, to extract information or a data bit transmitted in the signal. Based on a requirement or an expectation, the BBP is usually implemented in one or more digits in the modem processor 304 or implemented as a separated integrated circuit (IC).

In a design, the modem processor (modem processor) 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent on an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. The units perform processing based on a radio access technology used in a radio access network.

The modem processor 304 receives, from the application processor 302, digitalized data that may represent a voice, data, or control information, and processes the digitalized data for transmission. The modem processor may support one or more of a plurality of communication systems using a plurality of wireless communication protocols, for example, an LTE communication system, a universal mobile telecommunications system (Universal Mobile Telecommunications System, UMTS), a high speed packet access (High Speed Packet Access, HSPA) communication system, a 5th generation (5th Generation, 5G) communication system, and even subsequent 6th generation and 7th generation communication systems. Optionally, the modem processor 304 may also include one or more memories.

Optionally, the modem processor 304 and the application processor 302 may be integrated in one processor chip.

The memory 303 is configured to store program code (which is sometimes referred to as a program, an instruction, software, or the like) and/or data that are/is used to support communication of the terminal device.

It should be noted that the memory 203 or the memory 303 may include one or more storage units, for example, may be a storage unit that is inside the processor 201, the modem processor 304, or the application processor 302 and that is configured to store program code, or may be an external storage unit independent of the processor 201, the modem processor 304, or the application processor 302, or may be further a component including a storage unit inside the processor 201, the modem processor 304, or the application processor 302 and an external storage unit independent of the processor 201, the modem processor 304, or the application processor 302.

It should be noted that the processor 201 and the modem processor 304 (which is referred to as a processor 304 for short below) may be processors of a same type or processors of different types. For example, the processor 201 or the modem processor 304 may be implemented as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, another integrated circuit, or any combination thereof. The processor 201 and the modem processor 304 may implement or execute various example logical blocks, modules, and circuits described with reference to content disclosed in embodiments of the present invention. The processor may alternatively be a combination of devices implementing a computing function, for example, a combination including one or more microprocessors, a combination of a DSP and a microprocessor, or a system-on-a-chip (system-on-a-chip, SoC).

A person skilled in the art can understand that various explanatory logic blocks, modules, circuits, and algorithms described with reference to the various aspects disclosed in this application may be implemented as electronic hardware, instructions that are stored in a memory or another computer-readable medium and that are executed by a processor or another processing device, or a combination thereof. For example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

Figure 4:
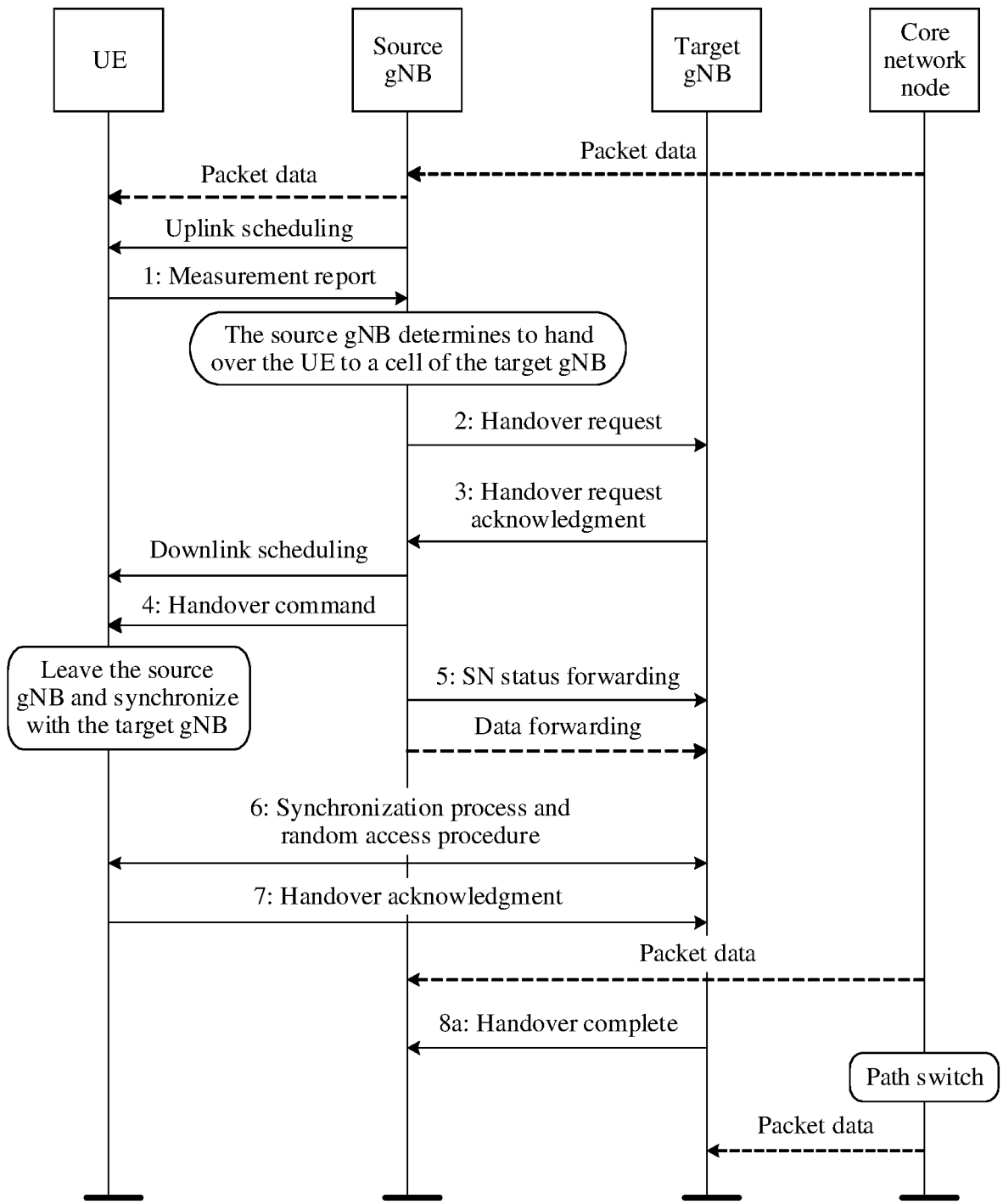
FIG. 4 is a schematic diagram of an example handover procedure according to an embodiment of this application.

The following uses FIG. 4 as an example to describe a handover procedure.

In example descriptions provided in FIG. 4, the handover procedure is a handover procedure initiated by a source base station (namely, a source gNB (Source gNB, SgNB)). In the handover procedure, the SgNB determines, based on a measurement report reported by user equipment (user equipment, UE), to perform handover, and initiates a handover request to a target gNB (Target gNB, TgNB). After obtaining a handover acknowledgment of the TgNB, the SgNB sends a handover command to the UE. After receiving the handover command, the UE stops performing uplink or downlink data sending with the SgNB, starts to synchronize with the TgNB, and initiates a random access procedure. When sending the handover command to the UE, the SgNB stops performing uplink or downlink data transmission with the UE, and sends data stored in the SgNB to the TgNB. After successfully accessing the TgNB, the UE starts to transmit uplink or downlink data with the TgNB.

A detailed handover procedure is as follows:
 1: In a handover preparation phase, the UE in a radio resource control (radio resource control, RRC) connected state sends the measurement report (Measurement Report, MR) according to a measurement reporting trigger criterion configured by the base station.

2: The SgNB determines the TgNB for the UE based on the measurement report of the UE and a radio resource management (radio resource management, RRM) algorithm when the UE meets a handover condition, and sends context (Context) information of the UE to the TgNB with the handover request.

3: The TgNB performs preparation for the UE to be handed over, to be specific, allocates a cell radio network temporary identifier (cell radio network temporary identifier, C-RNTI) and another parameter to the UE, and returns the C-RNTI and the another parameter to the SgNB in a handover request acknowledgment message.

4: The SgNB sends the "handover (HO) command" to the UE. After receiving the handover command, the UE stops performing uplink or downlink data transmission with the SgNB, and synchronizes with the TgNB.

5: The source station sends, to the target station, status information related to a sequence number (sequence number, SN), for example, a specific SN corresponding to a data packet that has been sent, and/or a specific SN corresponding to a data packet that has not been sent.

6: After disconnecting the data transmission from the SgNB, the UE starts a downlink synchronization process with the TgNB. The UE initiates the random access procedure to obtain uplink timing and uplink resource allocation. The TgNB sends a timing advance (timing advance, TA) to the UE, and indicates, to the UE, a resource allocated to the UE. The information is to be used by the UE to send an RRC connection reconfiguration complete message to the TgNB, to indicate that the handover is completed.

7: The UE sends "handover acknowledgment" information to the TgNB, to indicate that the handover is completed.

8: The TgNB indicates, to the SgNB, that the handover is completed, so that the SgNB releases the context information of the UE.

In addition, the TgNB indicates a core network node to update data forwarding TgNB information, so that a core network may send data of the UE to the TgNB.

If handover occurs in a multicast transmission process, the UE that currently receives a multicast service from the SgNB needs to perform a handover procedure, to be handed over to the TgNB. In this case, progress of the multicast service on the two gNBs may be inconsistent. If handover is performed according to a procedure similar to that shown in FIG. 4, the UE may receive some redundant data packets or data interruption may occur. For example, if multicast service progress of the SgNB lags behind that of the TgNB, the UE may lose a part of data packets. For another example, if multicast service progress of the SgNB is ahead of that of the TgNB, the UE receives a redundant or repeated data packet. These may cause a service error or service interruption on a UE side, and affect communication performance.

Figure 5:
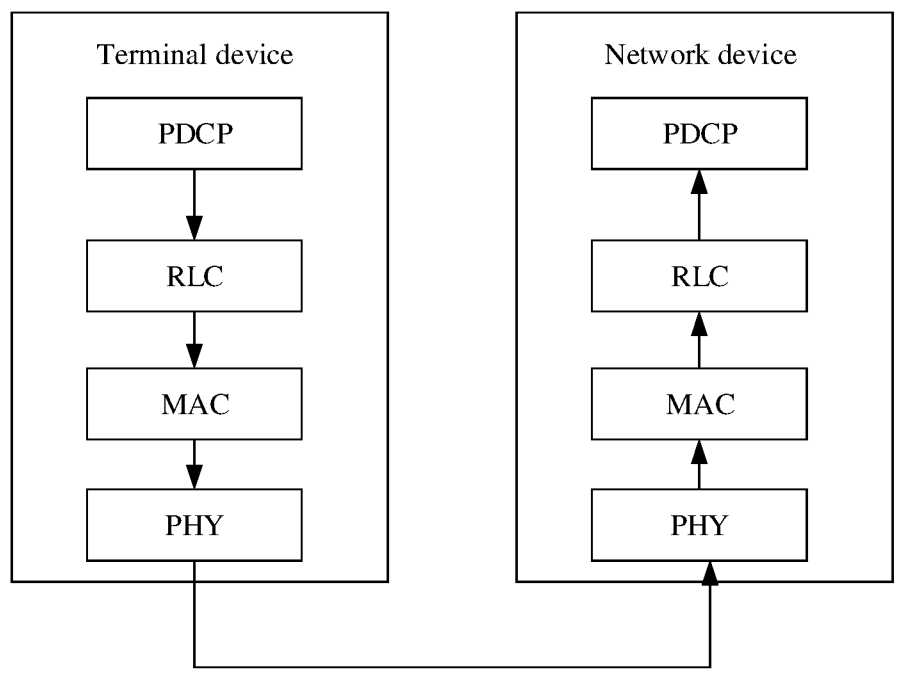
FIG. 5 is a schematic diagram of data transmission at layers of protocol stacks according to an embodiment of this application.

Uplink data transmission is used as an example to describe data transmission between a network device and a terminal device. FIG. 5 is a schematic diagram of data transmission at layers of protocol stacks. Data first arrives at a PDCP layer of the terminal device. After being processed at the PDCP layer, the data is transmitted to a radio link control RLC layer and a MAC layer. After being processed at the MAC layer, the data is sent to the network device via a physical layer. When the network device receives the data, protocol layers that the data sequentially passes through are a physical layer, a MAC layer, an RLC layer, and a PDCP layer. Data on each radio bearer needs to be processed at each layer. Each layer has a corresponding functional entity to perform a corresponding function. For example, the PDCP layer corresponds to a PDCP entity, the RLC layer corresponds to an RLC entity, and the MAC layer corresponds to a MAC entity. On a network device side or a terminal device side, each radio bearer includes one PDCP entity and one or more RLC entities, and each RLC entity corresponds to one logical channel. One MAC entity corresponds to a plurality of logical channels. Data on the logical channels may be multiplexed at the MAC layer, for example, multiplexed into a same data block at the MAC layer, and finally sent via the physical layer. A downlink data transmission process is similar.

A terminal device currently receives, from a source base station, a data packet that is of a first service and that is sent in a multicast transmission mode (which may also be understood as a multicast service). During handover, the terminal device is handed over from the source base station to a target base station, and the terminal device needs to continue to receive the data packet of the multicast service from the target base station. However, if the source base station and the target base station have inconsistent service progress, some data packets are repeatedly received or some data packets cannot be received on a terminal device side. Consequently, the multicast service is interrupted, and service continuity cannot be met.

Based on this, this application provides a communication method and apparatus. The method relates to a scenario in which the source base station and the target base station both provide multicast transmission for the first service in a communication system. The source base station and the target base station each may determine transmission progress of the multicast service on the peer base station based on a service progress indication of a core network device through interaction between the source base station and the target base station, so that the data packet may continue to be accurately transmitted on the target base station after the terminal device completes the handover, and service transmission continuity is ensured. For example, service progress on the source base station is slow. In this case, the target base station sends a data packet to the terminal device in a unicast transmission mode to align the service progress, and the terminal device may receive both the data packet sent in the unicast transmission mode and the data packet sent in the multicast transmission mode. In this way, a service progress difference between the source base station and the target base station can be compensated for. In addition, the unicast transmission mode can ensure that a part of data packets are sent only to a terminal device for which a service progress difference needs to be compensated, and this avoids impact on another terminal device that receives the data packet of the multicast service. After receiving the data packets, the terminal device first delivers or sends, to an upper layer, the data packet that is sent in the unicast transmission mode and that is used to compensate for the service progress difference, and then delivers, to an upper layer entity, the data packet sent in the multicast transmission mode, to avoid service interruption or disorder. For another example, service progress on the source base station is fast. In this case, the target base station needs to notify the terminal device of a specific data packet from which the terminal device starts to deliver data packets to an upper layer entity after receiving the data packets sent by the target base station in the multicast transmission mode, to prevent the upper layer entity from repeatedly receiving some data packets. In this way, continuity of the multicast service can be ensured, and therefore transmission performance of the multicast service is improved.

Herein, it should be noted that this application relates to expressions of a plurality of sequence numbers of data packets, for example, a service progress sequence number, a PDCP sequence number, an RLC sequence number, and another layer 2 sequence number. The service progress sequence number is visible to the source base station and the target base station, that is, the base stations on both sides have a unified understanding on the service progress sequence number. The service progress sequence number herein is used to enable the source base station and the target base station to learn of service transmission progress, and a name of the service progress sequence number is not limited. An existing sequence number (for example, a GPRS tunneling protocol-user plane (GPRS Tunneling Protocol-User Plane, GTP-U) sequence number) may be reused, or a newly defined sequence number with another name or even identification information in another form may be used, to perform progress unification. The sequence number with the another name or the identification information in the another form may be used to indicate a location or a sequence of a specific data packet in at least one data packet, so as to indicate service progress. The source base station and the target base station may determine, by using a service progress sequence number of a data packet of a corresponding service, whether the base stations on both sides have different transmission progress of the data packet of the service. However, when the data packet is transmitted between a network device and the terminal device, the service progress sequence number is usually not carried. Consequently, the terminal device cannot learn of the service progress sequence number of the data packet, that is, the service progress sequence number is invisible to the terminal device. However, the terminal device may determine a PDCP sequence number, an RLC sequence number, and another layer 2 sequence number of the data packet. In other words, the terminal device may uniquely determine a data packet by using any one of the PDCP sequence number, the RLC sequence number, or the another layer 2 sequence number. For ease of description, the "service progress sequence number" (referred to as a progress sequence number for short below) and information that is in another form or has another name and that can be used for progress identification are collectively referred to as progress identifiers in the following descriptions, that is, the "progress identifier" is not limited only to the service progress sequence number or the GTP-U sequence number. The "PDCP sequence number", the "RLC sequence number", and the another layer 2 sequence number are collectively referred to as sequence numbers. If there is other identification information that can be used by the terminal device to identify a data packet, the identification information and the foregoing sequence numbers may also be collectively referred to as data packet identifiers. There is a correspondence between a data packet identifier and a progress identifier that correspond to a same data packet. It should be further noted that the progress identifier and the PDCP sequence number, the RLC sequence number, or the another layer 2 sequence number are independently configured by different entities. However, a correspondence between the progress identifier and each layer 2 sequence number may be determined through interaction among the core network device, the source base station, and the target base station. For example, the progress identifier is the progress sequence number, and a data packet whose progress sequence number is 1 corresponds to a data packet whose PDCP sequence number is 3. A correspondence between various sequence numbers is not specifically limited in this application. For details, refer to a current technology or a specification in a protocol.

Figure 6:
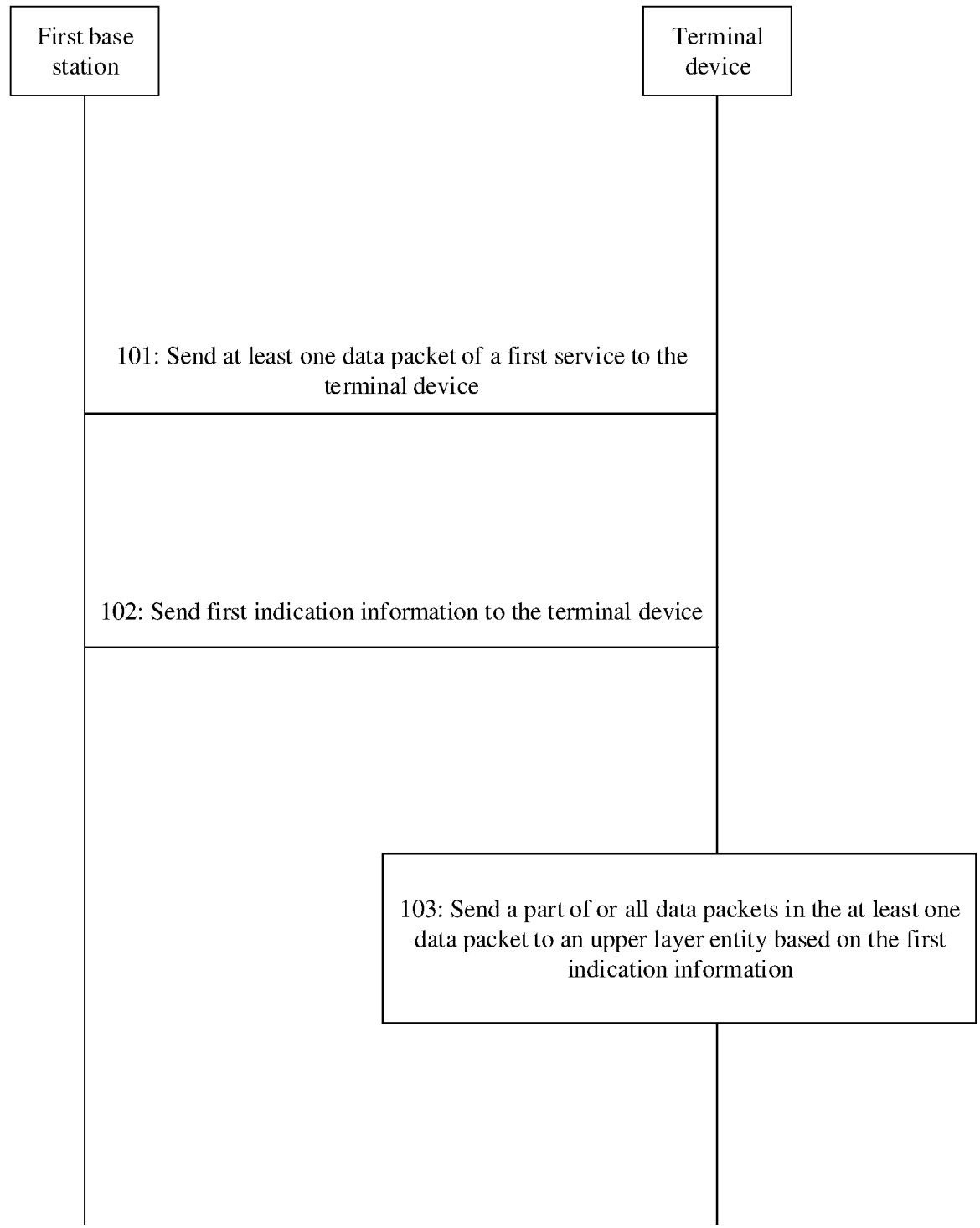
FIG. 6 is a schematic flowchart of a communication method according to an embodiment of this application.

FIG. 6 is a schematic flowchart of a communication method according to an embodiment of this application. The method includes but is not limited to the following steps:

101: A first base station sends at least one data packet of a first service to a terminal device.

The at least one data packet includes at least one of the following: at least one first data packet, at least one second data packet, or at least one first data packet and at least one second data packet. The at least one first data packet is sent by the first base station in a multicast transmission mode. The at least one second data packet is sent by the first base station in a unicast transmission mode.

Optionally, the terminal device is handed over from a second base station to the first base station. In other words, the second base station is a source base station, and the first base station is a target base station, that is, a serving base station to which the terminal device is handed over. In addition, the first base station and the second base station each may provide a multicast transmission service of the first service. Therefore, after completing the handover, the terminal device may still receive the data packet of the first service from the target base station, to ensure that transmission of the first service is not interrupted.

In an optional design, a corresponding bearer is established between the first base station and the terminal device to transmit the data packet. Specifically, the first base station sends the at least one first data packet to the terminal device in the multicast transmission mode by using a first bearer, and/or the first base station sends the at least one second data packet to the terminal device in the unicast transmission mode by using a second bearer. Further, optionally, the first bearer may be the same as or different from the second bearer. A quantity of first bearers and a quantity of second bearers are not specifically limited in this application. The first base station may send the data packet by using one or more first bearers and/or one or more second bearers. Alternatively, when the data packet is sent in the multicast transmission mode, the data packet may be sent by using a corresponding time-frequency resource.

Specifically, the first service may be a service that a plurality of terminal devices are interested in. To be specific, a network device needs to perform point-to-multipoint sending for the first service in the multicast transmission mode. For example, the first service may be a live broadcast service, a video on demand service, or a one-to-many service in a data communication (for example, batch software update) or public safety scenario in industry. A type of the first service is not specifically limited in this application.

Correspondingly, the terminal device receives the at least one data packet.

102: The first base station sends first indication information to the terminal device, and the terminal device receives the first indication information from the first base station.

103: The terminal device sends a part of or all data packets in the at least one first data packet to an upper layer entity of the terminal device based on the first indication information.

In step 101, after the terminal device receives the at least one data packet, the at least one data packet is sequentially processed at a physical layer, a MAC layer, and an RLC layer, then the at least one data packet is delivered to a PDCP layer for processing, and then the at least one data packet is sent to a higher layer of the terminal device. In other words, sending in step 103 may be understood as: The terminal device sends the part of or all the data packets in the at least one data packet from a bottom layer entity of the terminal device to the upper layer entity based on the first indication information. Therefore, the upper layer entity in step 103 is an entity at a protocol layer above the PDCP layer in a protocol stack, for example, a transport layer entity or an application layer entity such as an SDAP layer entity or a TCP/IP layer entity. Specifically, the bottom layer entity may be a physical layer entity, a MAC layer entity, an RLC layer entity, a PDCP layer entity, or the like. A specific entity is not limited in this application. Further, the upper layer entity of the terminal device performs processing corresponding to a function of the upper layer entity on the data packet. For example, the TCP/IP layer entity performs processing such as transmission control or routing, and the application layer entity performs content parsing to obtain content of the data packet and presents the content in an appropriate manner.

Specifically, the first indication information is for indicating transmission that is of the terminal device and that corresponds to the part of or all the data packets in the at least one data packet. The transmission herein means that the RLC layer entity, the PDCP layer entity, or another layer 2 protocol layer entity of the terminal device sends or delivers the part of or all the data packets in the at least one data packet to the upper layer entity. In other words, because step 103 relates to interaction between entities at different layers in the protocol stack on a terminal device side, "sending" in step 103 may also be understood as delivery, is transmission between layers, and belongs to internal transmission of the terminal device. Sending to the upper layer entity and delivery to the upper layer entity in this application have a same meaning.

According to the foregoing communication method provided in this application, the target base station sends the indication information to the terminal device, to indicate transmission of the terminal device to the upper layer entity. For example, the indication information indicates a specific data packet that is in the at least one data packet received from the target base station and that needs to be sent or delivered to the upper layer entity by the RLC layer entity, the PDCP layer entity, or the another layer 2 protocol layer entity of the terminal device, and indicates a sending or delivery sequence. In a handover scenario, although both the source base station and the target base station may provide multicast transmission for a same service, the foregoing method may be used to avoid service interruption or service redundancy on the terminal device side caused by service progress inconsistency between the source base station and the target base station due to the handover, ensure continuity of multicast communication, and improve service processing performance and efficiency of the terminal device. Specific descriptions of the foregoing steps are described in detail in the following specific implementations.

In a communication process, there are a plurality of possible scenarios. In a scenario, transmission progress of the first service on the source base station is slower than transmission progress of the first service on the target base station. In another scenario, transmission progress of the first service on the source base station is faster than transmission progress of the first service on the target base station. In the two scenarios, if the target base station does not give a corresponding indication, the service data packet is interrupted or repeatedly received after the terminal device is handed over to the target base station. The following separately describes the two scenarios in detail based on the processing procedure shown in FIG. 6. A person skilled in the art may know that if the source base station and the target base station have same transmission progress for the first service, theoretically, the terminal device may correctly send the data packet to the upper layer entity without an additional indication. However, because specific time is required for performing a handover procedure, even if the two base stations have the same service progress, the terminal device may miss receiving a part of data packets in the handover procedure. Therefore, during handover, if the target base station does not perform indication, service continuity of the terminal device still cannot be ensured. For the technical solutions provided in this application, even if the two base stations have the same service progress, the target base station may still give a corresponding indication, to ensure that the terminal device neither loses a packet nor repeatedly receives a data packet, and delivers or sends the data packet to the upper layer entity in a specific sequence.

Figure 7:
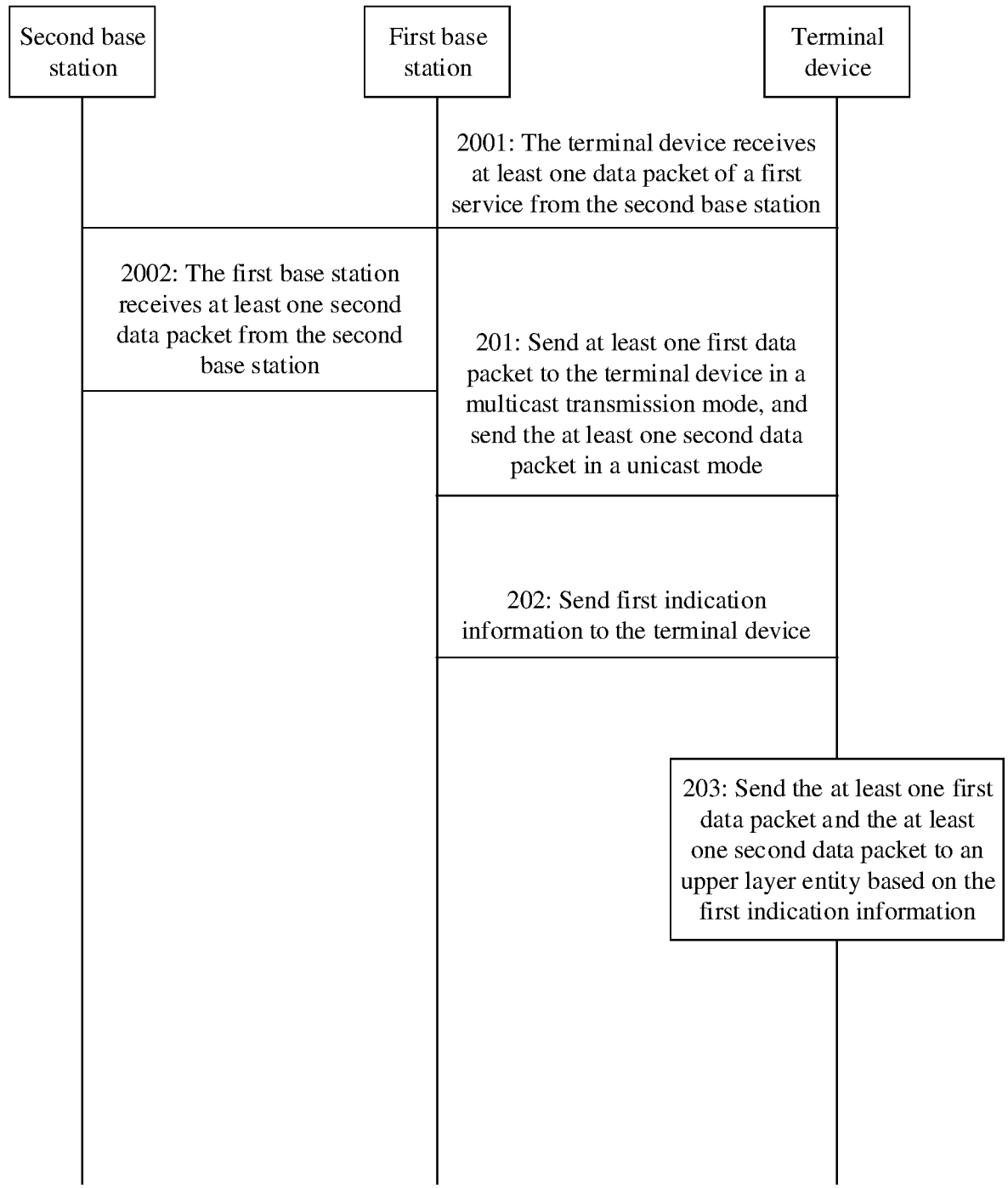
FIG. 7 is a schematic flowchart of another communication method according to an embodiment of this application.

For a first implementation, refer to FIG. 7. FIG. 7 is a schematic flowchart of another communication method according to an embodiment of this application.

In this implementation, a first base station (for example, a target base station) determines, by using a progress identifier of a data packet of a first service, that transmission progress of a second base station (for example, a source base station) for the first service is slower than that of the first base station, and further determines a correspondence between the progress identifier and a layer 2 sequence number of the corresponding data packet. The layer 2 sequence number may be a PDCP sequence number, an RLC sequence number, or another layer 2 sequence number. This is not specifically limited. For example, the progress identifier is a progress sequence number. The second base station currently sends a data packet whose progress sequence number is 3, and a terminal device has received, before handover, a data packet whose progress sequence number is less than 3. However, the first base station currently sends a data packet whose progress sequence number is 8. In this case, the first base station may determine that the terminal device has not received data packets whose progress sequence numbers are 3 to 7. From a perspective of the terminal device, the terminal device has not received data packets whose data packet identifiers are 22 to 26, so that the data packets whose data packet identifiers are 22 to 26 are the data packets whose progress sequence numbers are 3 to 7. For ease of description, the following mostly explains and describes this embodiment from a perspective of the base station by using the progress sequence number as an example. A person skilled in the art may know that the terminal device may determine data packet transmission and processing progress by using a corresponding data packet identifier.

The communication method includes the following steps:

2001: The terminal device receives at least one data packet of the first service from the second base station. The at least one data packet from the second base station may be referred to as an initial data packet or a data packet before handover. Then, the terminal device is handed over from the second base station to the first base station, that is, the target base station. For a specific handover procedure, refer to the foregoing descriptions. Details are not described herein again.

2002: The first base station receives at least one second data packet of the first service from the second base station, or the first base station may determine, in cached data packets, at least one second data packet of the first service. The at least one second data packet represents a difference between the transmission progress of the first base station for the first service and the transmission progress of the second base station for the first service. In other words, the at least one second data packet does not belong to the at least one data packet in step 2001. For example, the progress identifier is the progress sequence number. The at least one second data packet is the data packets whose progress sequence numbers are 3 to 7. These data packets whose progress sequence numbers are 3 to 7 need to be sent to the terminal device, to ensure that the first service is not interrupted due to a data packet loss caused by the handover. However, steps 2001 and 2002 are optional. An operation performed by the terminal device before the handover and how the first base station obtains the at least one second data packet are not specifically limited in this application.

The communication method includes but is not limited to the following steps:

201: The first base station sends at least one first data packet of the first service to the terminal device in a multicast transmission mode, and sends the at least one second data packet of the first service to the terminal device in a unicast transmission mode.

Correspondingly, the terminal device receives the at least one first data packet and the at least one second data packet. The first data packet is a multicast data packet, and the second data packet is a unicast data packet. The multicast data packet and the unicast data packet are used for ease of description.

Herein, it should be noted that, because the first base station currently sends the at least one first data packet of the first service in the multicast transmission mode, to ensure that the lost data packet is sent to the terminal device, the first base station needs to send the at least one second data packet to the terminal device in the unicast transmission mode, to ensure that the terminal device can receive the at least one second data packet and that the at least one second data packet is not repeatedly received by another terminal device that is receiving the multicast data packet, so that interference to the another terminal device is reduced, and communication performance is improved.

Specifically, a data packet transmitted on a first bearer is transmitted in the multicast transmission mode. To be specific, the first base station sends the at least one first data packet in the multicast transmission mode by using the first bearer. A data packet transmitted on a second bearer is transmitted in the unicast transmission mode. To be specific, the first base station sends the at least one second data packet in the unicast transmission mode by using the second bearer. Further, optionally, the first bearer may be the same as or different from the second bearer.

In an optional design, the first bearer is different from the second bearer. That is, the second bearer is separately established for unicast transmission of the at least one second data packet. For details, refer to a schematic diagram of a bearer structure provided in FIG. 8A.

Figure 8A:
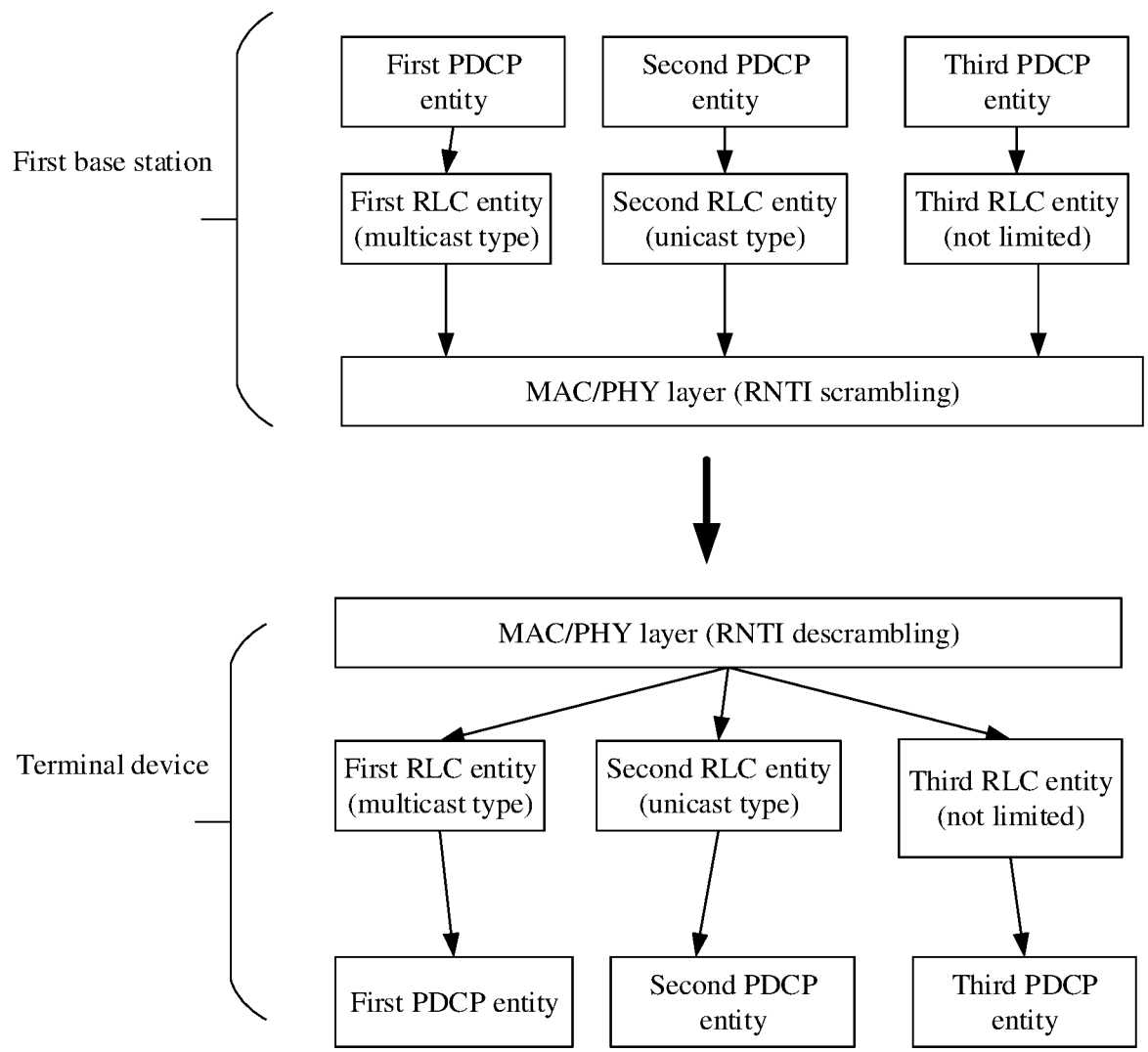
FIG. 8A is a schematic diagram of a bearer structure according to an embodiment of this application.

In FIG. 8A, for the first base station and the terminal device, first bearers on both sides each include a first PDCP entity and at least one first RLC entity that are configured to send and receive multicast data packets, and second bearers each include a second PDCP entity and at least one second RLC entity that are configured to send and receive unicast data packets. Herein, it should be noted that FIG. 8A shows only an example of one first RLC entity and at least one second RLC entity, and actually, a quantity of RLC entities included in each bearer is not limited.

In this optional design, because the first bearer is different from the second bearer, the terminal device needs to determine that data packets received by using the two bearers belong to the same first service. Therefore, the first base station further sends indication information to the terminal device, where the indication information is for indicating that the first bearer is associated with the second bearer, or is for indicating that the first bearer and the second bearer correspond to the same first service. After receiving the indication information, the terminal device may learn, based on the indication information, that data packets on a plurality of bearers indicated by the indication information belong to a same service, so that the terminal device may perform corresponding processing based on the data packets received by using the first bearer and the second bearer. The indication information herein may be referred to as third indication information.

Optionally, the third indication information may be sent independently, or may be sent by using a bearer configuration message, a bearer establishment message, or a bearer modification message of the second bearer. Specifically, the third indication information may be identification information of the first bearer, for example, a bearer identifier (identity, ID). Optionally, the third indication information may alternatively indicate, by carrying a same identifier in bearer configuration messages, bearer establishment messages, or bearer modification messages of the first bearer and the second bearer, that the two bearers are associated or correspond to a same service.

In this optional design, unicast transmission and multicast transmission are separately performed by using different bearers, and therefore transmission efficiency and performance are improved.

In another optional design, the first bearer is the same as the second bearer. Herein, that the first bearer is the same as the second bearer means that the first bearer and the second bearer are a same bearer and uses a same PDCP entity. For details, refer to a schematic diagram of another bearer structure provided in FIG. 8B.

Figure 8B:
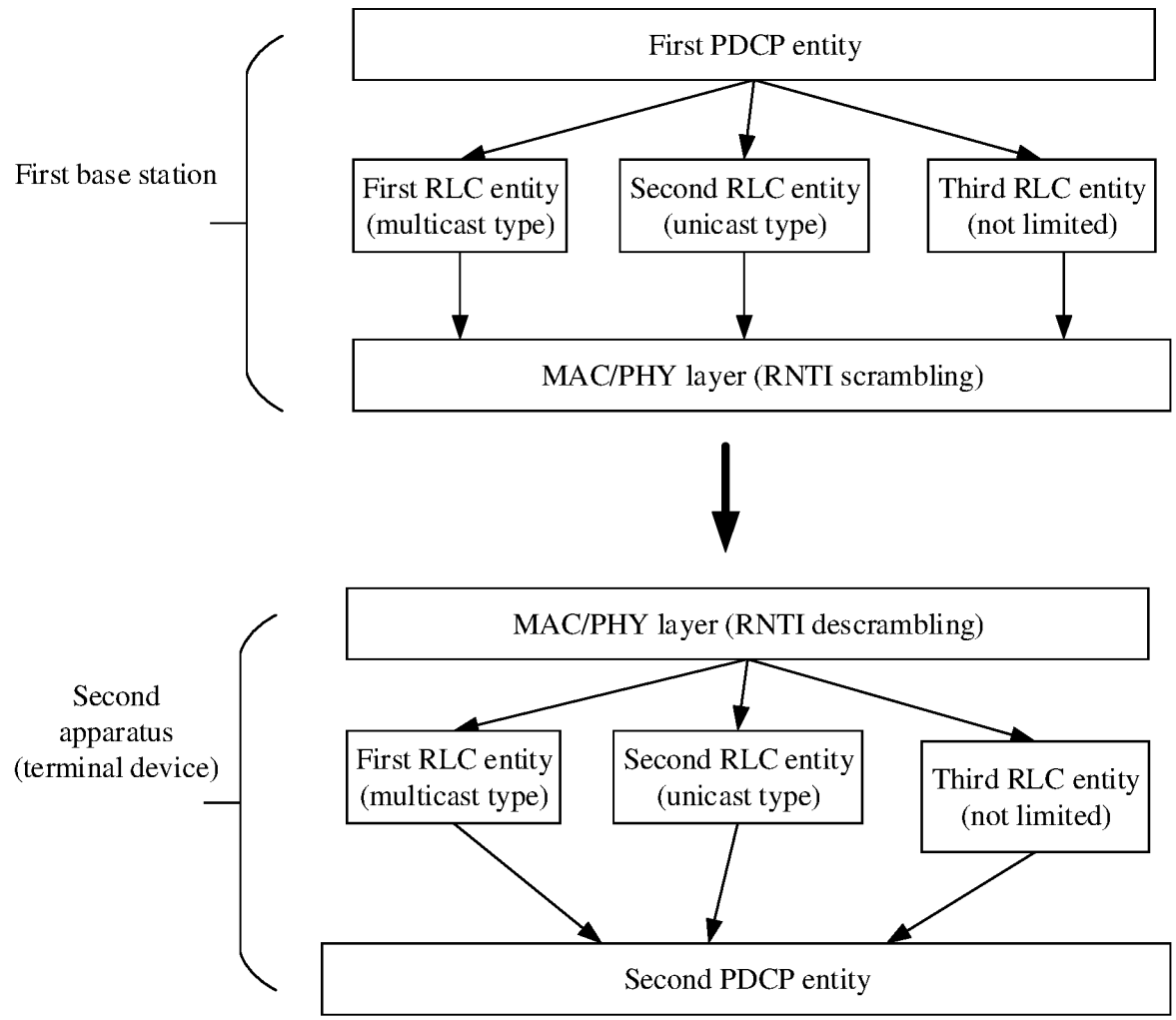
FIG. 8B is a schematic diagram of another bearer structure according to an embodiment of this application.

On either side of the first base station and the terminal device, a first PDCP entity is associated with at least two RLC entities, a data packet sent in the multicast transmission mode is sent by using at least one first RLC entity, and a data packet sent in the unicast transmission mode is sent by using at least one second RLC entity different from the at least one first RLC entity. These RLC entities may work simultaneously, that is, unicast transmission and multicast transmission are simultaneously performed on one bearer. If one of the unicast transmission and the multicast transmission ends, for example, if the unicast transmission ends, the at least one second RLC entity corresponding to the unicast transmission may be deactivated, and the multicast transmission continues to be performed by using the at least one first RLC entity. As shown in FIG. 8B, for the first base station and the terminal device, the unicast transmission and the multicast transmission may be completed by using a same bearer.

In this optional design, a single bearer is used to simultaneously perform the unicast transmission and the multicast transmission, thereby reducing transmission and design complexity. In this design, the base station does not need to establish two bearers and separately perform processing, and may establish only one bearer for transmission, so that resource overheads can be reduced.

Herein, it should be noted that for FIG. 8A, whether third bearers used for transmission of another service exist for a network device and the terminal device is not limited in this application. Optionally, the third bearer may include a third PDCP entity and at least one third RLC entity. For FIG. 8B, the same bearer may further include or not include a third RLC entity configured to perform corresponding data packet transmission, for example, unicast or multicast transmission. However, a transmission type corresponding to the third RLC entity is not limited in this application.

202: The first base station sends first indication information to the terminal device. Correspondingly, the terminal device receives the first indication information.

203: Send the at least one first data packet and the at least one second data packet to an upper layer entity based on the first indication information.

The first indication information is for indicating transmission that is of the terminal device and that corresponds to the at least one data packet and the at least one second data packet. Herein, the transmission means that the terminal device sends the at least one first data packet and the at least one second data packet to the upper layer entity.

In the communication method, because the service progress of the source base station for the first service is slower than that of the target base station, the target base station needs to trigger unicast transmission for a part of data packets, to ensure that a data packet loss does not occur on the terminal device because the progress of the target base station to which the terminal device is handed over is faster. In addition, the target base station uses the first indication information to indicate the terminal device to perform further sending to the upper layer entity. This solution improves reliability of multicast communication and ensures successful running of a multicast service without interruption.

The first indication information may also have a plurality of possible implementations, and a function of the first indication information is to notify, to the terminal device, that the data packets should be delivered to the upper layer entity in a first sequence. Otherwise, the terminal device cannot determine a delivery sequence of the data packets, and consequently disorder occurs.

In an optional design, the first indication information may be for indicating that the transmission of the at least one second data packet is completed. After receiving the first indication information, the terminal device determines that the transmission of the at least one second data packet in the unicast transmission mode is completed, and may send the at least one first data packet to the upper layer entity after sending the at least one second data packet to the upper layer entity.

For example, the first indication information is for indicating that the transmission of the at least one second data packet is completed. This example may also be understood as follows: The first indication information is for indicating that receiving progress of the terminal device for the first service catches up with the transmission progress of the second base station for the data packet of the first service. In this design, the first indication information may be a dedicated data packet, for example, a data packet specially designed for indicating that data packet transmission is completed. "Dedicated" herein only indicates that a function of the data packet is to specially indicate that the transmission of the at least one second data packet is completed. Alternatively, the first indication information may be a control data packet, for example, a control protocol data unit (protocol data unit, PDU). Optionally, the control PDU may be an end marker (end marker) PDU, an RLC control PDU, a PDCP control PDU, or another layer 2 control PDU.

Further, optionally, the end marker PDU includes at least one of the following fields: a D/C (data/control, data/control) field, a PDU type field, and an identifier field. The D/C field is used to indicate whether the PDU is a data PDU or a control PDU. The PDU type field is used to indicate which type of control PDU the PDU is, for example, may indicate that the PDU is an end marker (end marker) PDU. The identifier field is used to indicate a bearer ID corresponding to the at least one second data packet or a service ID of the first service. In another possible implementation, the first indication information may also be carried in control signaling. The control signaling may be physical layer signaling (for example, downlink control information DCI) or higher layer signaling. The higher layer signaling may be a MAC CE, RRC signaling, or the like.

For another example, the first indication information is for indicating to release a bearer used for the at least one second data packet, that is, the second bearer. Specifically, the first indication information may be bearer release indication information. For example, the first indication information may be carried in RRC signaling. Optionally, the first indication information may be carried in a RadioBearerConfig information element of the RRC signaling, or is indicated by using a drb-ToReleaseList information element, an srb-ToReleaseList information element, or the like. A specific name of the information element may change with evolution of a standard. In this optional design, the first indication information indicates, to the terminal device when indicating to release the bearer, that the transmission of the at least one second data packet is completed. This indication manner may be understood as an implicit indication manner, and no additional transmission complete indication is required. The bearer release indication information is reused to indicate that the transmission ends or the transmission is completed.

For still another example, the first indication information is for indicating to deactivate (deactivate) the unicast transmission of the at least one second data packet. It has been pointed out in the foregoing descriptions of the bearer architecture that unicast and multicast transmission may be simultaneously performed on a same bearer. In this architecture, the first indication information may be for deactivating one of the transmission modes, or switch between different transmission modes. In this process, the radio bearer is not released, and only the transmission mode changes. The first indication information may be carried in existing signaling, for example, RRC signaling, a MAC control element (MAC control element, MAC CE), downlink control information (Downlink control information, DCI), or a control PDU, or may be carried in newly added signaling, for example, newly designed RRC signaling, a newly designed MAC CE, newly designed DCI, or a newly designed control PDU.

In this optional design, the sending the at least one first data packet and the at least one second data packet to an upper layer entity based on the first indication information specifically includes:

sending the at least one first data packet to the upper layer entity after receiving the first indication information and sending the at least one second data packet to the upper layer entity. In other words, the terminal device cannot send the at least one first data packet to the upper layer entity before receiving the first indication information. However, the at least one second data packet is not limited to being sent to the upper layer entity after the UE receives the first indication information. In addition, before completing sending the at least one second data packet to the upper layer entity, the terminal device is not allowed to send the at least one first data packet. This ensures that disorder does not occur during sending of the data packets of the first service.

For example, based on the foregoing descriptions, the at least one second data packet is the data packets whose progress sequence numbers are 3 to 7. After sending the second data packets whose progress sequence numbers are 3 to 7 to the terminal device in the unicast transmission mode, the first base station sends the first indication information. The at least one first data packet may be a data packet that is sent by the first base station in the multicast transmission mode and whose progress sequence number is greater than or equal to 8. Before or after receiving the first indication information, the terminal device may send the data packets whose progress sequence numbers are 3 to 7 to the upper layer entity. Further, only after sending of the data packets whose progress sequence numbers are 3 to 7 is completed, the terminal device is allowed to send a data packet whose progress sequence number is greater than 7 to the upper layer entity. It should be noted that the progress sequence numbers herein are invisible to the terminal device. In this case, for the terminal device, the terminal device may determine data packet identifiers corresponding to the data packets, for example, PDCP layer sequence numbers or RLC layer sequence numbers. The terminal device may determine, based on the data packet identifiers, a specific data packet that is received in the unicast mode and a specific data packet that is received in the multicast mode, and further determine, with reference to the first indication information sent by the network device, the first sequence for sending the data packets to the upper layer entity.

In other words, in this optional design, the first sequence means that when delivering the data packets to the upper layer entity of the terminal device, the at least one second data packet is delivered before the at least one first data packet. In other words, the first sequence means that the terminal device sends the at least one first data packet to the upper layer entity after sending the at least one second data packet to the upper layer entity.

Further, the first sequence indicates that the at least one first data packet is sent in ascending order of a data packet identifier (for example, a sequence number) of the at least one first data packet, and the at least one second data packet is sent in ascending order of a data packet identifier (for example, a sequence number) of the at least one second data packet. In this way, it can be ensured that the upper layer entity can process the first service in a correct sequence. It should be noted that the ascending order herein does not limitedly indicate that sequence numbers are consecutive. Assuming that a packet loss occurs, it still needs to be ensured that the upper layer entity performs sending in ascending order of sequence numbers. Further, optionally, the terminal device may send indication information to the upper layer entity to notify, to the upper layer entity, that the packet loss occurs, where the indication information may indicate or include a sequence number of a lost data packet, and the indication information herein is fourth indication information.

In this optional design, the terminal device does not need to receive and obtain additional information, can quickly determine that the transmission of the at least one second data packet is completed, and further perform a subsequent operation, so that service processing efficiency is improved.

In another optional design, the first indication information may indicate a first sequence number, or the first indication information may indicate a first data packet identifier. The following uses the first sequence number as an example for description. A person skilled in the art may know that a data packet identifier covers a wider range than a sequence number. In the following descriptions, a data packet identifier may also be used to replace a sequence number.

Specifically, the indication information is the sequence number or includes the sequence number. Alternatively, the first indication information does not include the sequence number, but a predefined or preset correspondence exists between the first indication information and the sequence number. In this case, the terminal device determines the first sequence number based on the first indication information.

For example, the first sequence number is a largest sequence number in a sequence number of the at least one second data packet.

For another example, the first indication information includes the first sequence number and second indication information, where the second indication information is for indicating that the first sequence number is a largest sequence number in a sequence number of the at least one second data packet.

The second indication information herein is for indicating that the first sequence number is a largest value, so that after receiving the first indication information, the terminal device may determine that the transmission of the at least one second data packet is completed.

In this optional design, the sending the at least one first data packet and the at least one second data packet to an upper layer entity based on the first indication information includes:

sending the at least one first data packet to the upper layer entity after sending, to the upper layer entity, a data packet that is in the at least one second data packet and whose sequence number is less than or equal to the first sequence number.

For example, based on the foregoing descriptions, the at least one second data packet is the data packets whose progress sequence numbers are 3 to 7. The first base station sends the second data packets whose progress sequence numbers are 3 to 7 to the terminal device. The first indication information indicates a progress sequence number 7. The at least one first data packet may be a data packet that is sent by the first base station in the multicast transmission mode and whose progress sequence number is greater than or equal to 8. After receiving the first indication information, the terminal device may determine, based on the progress sequence number 7 indicated by the first indication information, to send the data packets whose progress sequence numbers are 3 to 7 to the upper layer entity. Further, only after sending is completed, the terminal device is allowed to continue to send a multicast data packet whose progress sequence number is greater than 7 to the upper layer entity.

In other words, in this optional design, the first sequence means that when delivering the data packets to the upper layer entity of the terminal device, the data packet that is in the at least one second data packet and whose sequence number is less than or equal to the first sequence number is delivered before the at least one first data packet.

Further, the first sequence indicates that the at least one first data packet is sent in ascending order of a data packet identifier (for example, a sequence number) of the at least one first data packet, and the at least one second data packet is sent in ascending order of a data packet identifier (for example, a sequence number) of the at least one second data packet. For details, refer to the foregoing descriptions. Details are not described herein again.

In this optional design, the terminal device may obtain identification information of the data packet, and accurately determine a part of or all data packets that are in the at least one second data packet and that need to be first delivered to the upper layer entity, so that the terminal device is not affected by disorder and a latency in actual transmission of the indication information and the data packet, and service processing performance is improved.

Figure 9:
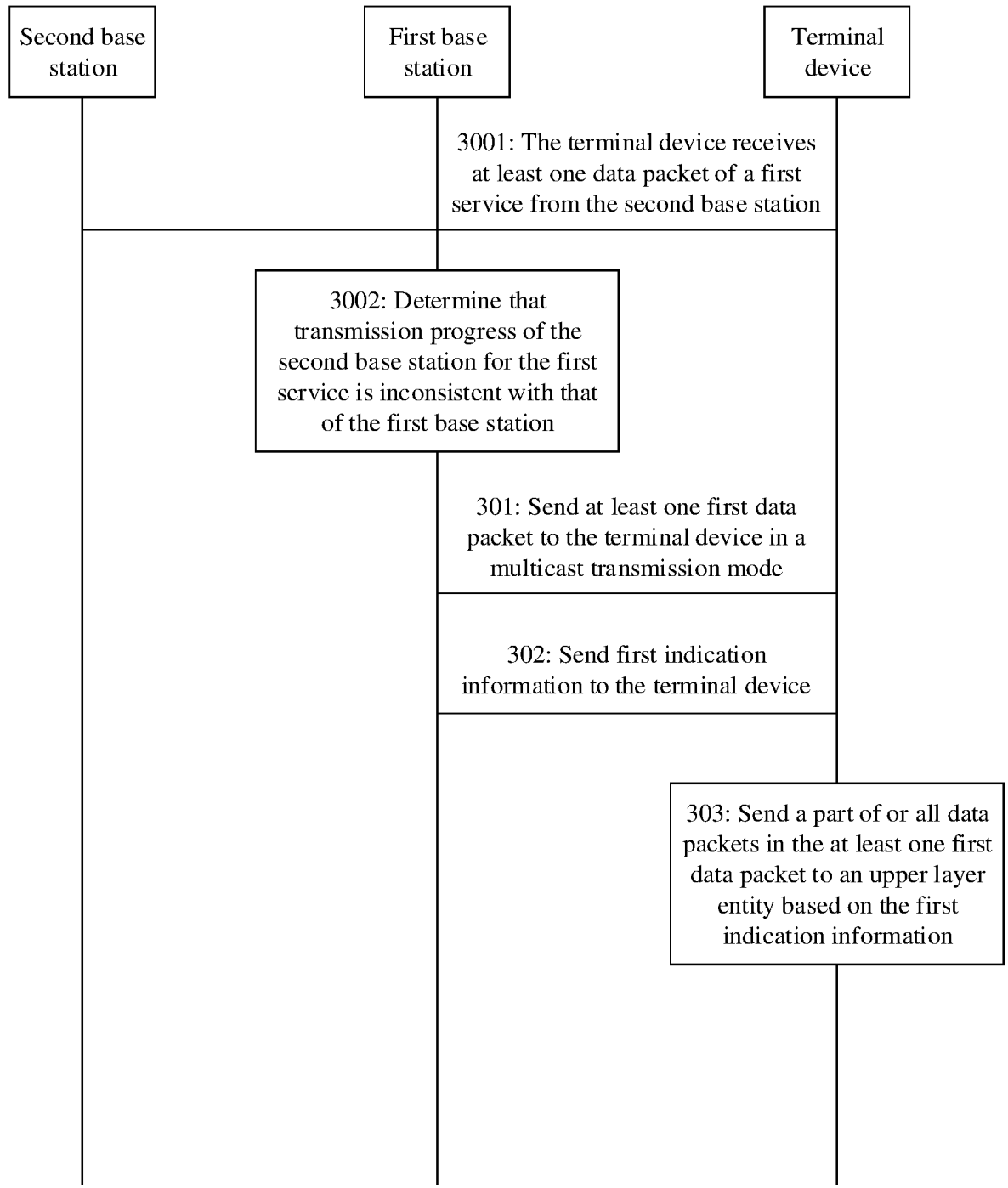
FIG. 9 is a schematic flowchart of still another communication method according to an embodiment of this application.

For a second implementation, refer to FIG. 9. FIG. 9 is a schematic flowchart of still another communication method according to an embodiment of this application.

In this implementation, a first base station (for example, a target base station) determines, by using a progress identifier of a data packet, that transmission progress of a second base station (for example, a source base station) for a first service is faster than that of the first base station. For example, the progress identifier is a progress sequence number. The second base station currently sends a data packet whose progress sequence number is 8, and a terminal device has received, before handover, a data packet whose progress sequence number is less than 8. However, the first base station currently sends a data packet whose progress sequence number is 4. In this case, the first base station may determine that the terminal device may further continue to receive data packets whose progress sequence numbers are 4 to 7 after completing handover. Receiving of these data packets causes redundancy and a waste of transmission resources, and may cause an error in processing of the first service. From a perspective of the terminal device, the progress sequence number is invisible, so that the terminal device may determine a corresponding data packet based on a corresponding data packet identifier. For ease of description, the following still mostly explains and describes this embodiment from a perspective of the base station by using the progress sequence number as an example.

The communication method includes the following steps:

3001: The terminal device receives at least one data packet of the first service from the second base station. The at least one data packet from the second base station may be referred to as an initial data packet or a data packet before handover. Then, the terminal device is handed over from the second base station to the first base station, that is, the target base station. For a specific handover procedure, refer to the foregoing descriptions. Details are not described herein again.

3002: The first base station determines that the transmission progress of the second base station for the first service is inconsistent with that of the first base station. Specifically, the first base station determines that the terminal device has received the at least one data packet from the second base station. Further, the first base station determines that at least one first data packet that is of the first service and that is sent by the first base station to the terminal device overlaps the at least one data packet that is of the first service and that is received by the terminal device from the second base station. For example, the terminal device has received the data packet whose progress sequence number is less than 8 from the second base station before handover. However, the first base station currently sends the data packet whose progress sequence number is 4. In this case, the first base station determines that the terminal device may receive the data packets whose progress sequence numbers are 4 to 7 again. Receiving of these data packets causes the redundancy. However, steps 3001 and 3002 are optional. An operation performed by the terminal device before handover and how the first base station determines whether the service transmission progress of the second base station is consistent with that of the first base station are not specifically limited in this application.

The communication method includes but is not limited to the following steps:

301: The first base station sends the at least one first data packet of the first service to the terminal device in a multicast transmission mode.

Correspondingly, the terminal device receives the at least one first data packet from the first base station. The first data packet is a multicast data packet.

In this step, the first base station may establish a first bearer, to send the at least one first data packet to the terminal device in the multicast transmission mode. For descriptions of the bearer, refer to the foregoing descriptions. Details are not described herein again.

302: The first base station sends first indication information to the terminal device. Correspondingly, the terminal device receives the first indication information.

303: The terminal device sends a part of or all data packets in the at least one first data packet to an upper layer entity of the terminal device based on the first indication information.

The first indication information is for indicating transmission that is of the terminal device and that corresponds to the part of or all the data packets in the at least one first data packet. Herein, the transmission means that the terminal device sends or delivers the part of or all the data packets in the at least one first data packet to the upper layer entity. For explanations of the upper layer entity, refer to the foregoing descriptions.

In the communication method, because the service progress of the source base station for the first service is faster than that of the target base station, the terminal device may receive a redundant data packet from the target base station after completing handover. To avoid the error in the processing of the first service that is caused when the terminal device sends the redundant data packet to the upper layer entity, the first base station uses the first indication information to indicate the terminal device to perform further sending to the upper layer entity. This solution improves reliability of multicast communication and ensures continuity of a multicast service.

The first indication information may have a plurality of possible implementations. The first indication information may be a dedicated data packet, for example, a data packet specially designed for indicating that data packet transmission is completed. Alternatively, the first indication information may be a control data packet, for example, a control protocol data unit (protocol data unit, PDU). Optionally, the control PDU may be a MAC CE PDU, an RLC control PDU, a PDCP control PDU, or an end marker (end marker) PDU. In another possible implementation, the first indication information may also be carried in control signaling, for example, physical layer signaling (downlink control information DCI) or higher layer signaling. The higher layer signaling may be RRC signaling or the like. A function of the first indication information is to notify, to the terminal device, that the data packet should be delivered to the upper layer entity in a first sequence. Otherwise, the terminal device cannot determine a delivery sequence of the data packet, and consequently disorder occurs.

In an optional design, the first indication information is for indicating a moment. The moment is a receiving moment of the first indication information, for example, a first moment. Herein, it should be noted that there is a latency between a moment at which a transmit end sends information and a moment at which a receive end receives the information, but the latency may be usually ignored. In addition, it is assumed that a sending sequence and a receiving sequence of a plurality of pieces of information are consistent. Even if inconsistency is caused by a latency or another reason, in this application, a receiving moment is used for description.

For example, the first indication information is for indicating that a data packet to be sent to the upper layer entity is a data packet that is in the at least one first data packet and whose receiving moment is later than the first moment. It may be understood that, after receiving the first indication information, the terminal device determines that the data packet that needs to be sent to the upper layer entity is a data packet that is in the at least one first data packet and that is received from the first base station after the first moment. Further, a data packet that is in the first data packet and that is received before the first moment is discarded.

In this optional design, the sending a part of or all data packets in the at least one first data packet to an upper layer entity based on the first indication information includes:

sending, to the upper layer entity in ascending order of a data packet identifier (for example, a sequence number), the data packet that is in the at least one first data packet and whose receiving moment is later than the receiving moment of the first indication information. In other words, the first sequence is the ascending order of the sequence number of the data packet that is in the at least one first data packet and whose receiving moment is later than the receiving moment of the first indication information. For explanations of the "ascending" order, refer to the foregoing descriptions.

For example, based on the foregoing descriptions, the terminal device starts to receive the first data packet from the first base station at a moment T0, and receives the first indication information at a moment T1. Between T1 and T0, the terminal device receives the first data packets whose progress sequence numbers are 4 to 7. It is assumed that layer 2 sequence numbers of the first data packets whose progress sequence numbers are 4 to 7 are 30 to 33. In this case, the terminal device determines, based on the first indication information, that the first data packets whose sequence numbers are 30 to 33 do not need to be sent to the upper layer entity. In other words, the terminal device determines to discard the first data packets whose sequence numbers are 30 to 33. However, data packets to be sent to the upper layer entity are first data packets received after the moment T1, for example, first data packets whose progress sequence numbers are 8 to 10. In this case, a universal set of the at least one first data packet received by the terminal device from the first base station is first data packets whose progress sequence numbers are 4 to 10, and a subset of the universal set, that is, the first data packets whose progress sequence numbers are 8 to 10, needs to be sent to the upper layer entity.

In this optional design, the terminal device does not need to receive and obtain additional information, can quickly determine, based on the first indication information, a starting data packet to be delivered to the upper layer entity, and further perform subsequent delivery processing, so that service processing efficiency is improved.

In another optional design, the first indication information may indicate a second sequence number, or the first indication information may indicate a second data packet identifier. The following uses the second sequence number as an example for description. A person skilled in the art may know that a data packet identifier covers a wider range than a sequence number. In the following descriptions, a data packet identifier may also be used to replace a sequence number.

Specifically, the indication information is the second sequence number or includes the second sequence number, and a specific implementation depends on a manner of sending the first indication information.

For example, the second sequence number is a smallest sequence number in sequence numbers of the part of or all the data packets in the at least one first data packet, or the second sequence number is a largest sequence number in a sequence number of a data packet other than the part of the data packets in the at least one first data packet.

The sending a part of or all data packets in the at least one first data packet to an upper layer entity based on the first indication information includes:

The terminal device sends, to the upper layer entity, a data packet that is in the at least one first data packet and whose sequence number is greater than the second sequence number. Further, optionally, a data packet that is in the at least one first data packet and whose sequence number is not greater than the second sequence number is discarded.

Alternatively, the terminal device sends, to the upper layer entity, a data packet that is in the at least one first data packet and whose sequence number is not less than the second sequence number. Further, optionally, a data packet that is in the at least one first data packet and whose sequence number is less than the second sequence number is discarded.

In this optional design, the sending a part of or all data packets in the at least one first data packet to an upper layer entity based on the first indication information includes:

sending the part of or all the data packets in the at least one first data packet to the upper layer entity in ascending order of the sequence numbers of the data packets. For example, the terminal device sends, to the upper layer entity in ascending order of a sequence number, the data packet that is in the at least one first data packet and whose sequence number is greater than the second sequence number, or the data packet that is in the at least one first data packet and whose sequence number is not less than the second sequence number.

For example, based on the foregoing descriptions, the second base station currently sends the first data packet whose progress sequence number is 8, and the terminal device has received, from the second base station before handover, the first data packet whose progress sequence number is less than 8. However, the first base station currently sends the data packet whose progress sequence number is 4. The terminal device continues to receive, from the first base station after completing handover, the data packet whose progress sequence number is 4 and a first data packet whose progress sequence number is greater than 4, including the first data packets whose progress sequence numbers are 4 to 7. The terminal device receives the first indication information from the first base station.

In a possible implementation, a layer 2 sequence number corresponding to the data packet whose progress sequence number is 7 is 33, and the first indication information indicates the sequence number 33. In this case, the terminal device determines to discard first data packets that are from the first base station and whose sequence numbers are not greater than 33, that is, first data packets whose sequence numbers are 30 to 33, and sends, to the upper layer entity, data packets whose sequence numbers are greater than or equal to 34, for example, first data packets whose sequence numbers are 34 to 36.

In another possible implementation, the first indication information indicates a sequence number 34. In this case, the terminal device determines to discard first data packets that are from the first base station and whose sequence numbers are less than 34, that is, first data packets whose sequence numbers are 30 to 33, and sends, to the upper layer entity, data packets whose sequence numbers are greater than 34, for example, first data packets whose sequence numbers are 34 to 36.

Results of the foregoing two implementations are the same, and a difference lies only in whether the first indication information indicates a largest value of a sequence number of a first data packet that needs to be discarded or a smallest value of a sequence number of a first data packet that needs to be sent to the upper layer entity. Content indicated by the first indication information may be pre-defined in a protocol or a standard, may be pre-negotiated between the network device and the terminal device, or may be preconfigured by the network device. This is not specifically limited, provided that the terminal device can determine subsequent processing after receiving the first indication information.

In this optional design, the terminal device may obtain identification information of the data packet, and accurately determine the part of or all the data packets that are in the at least one first data packet and that need to be delivered to the upper layer entity, so that the terminal device is not affected by disorder and a latency in actual transmission of the indication information and the data packet, and service processing performance is improved.

Herein, it should be noted that, in the first implementation and the second implementation, if the transmission progress of the source base station for the first service is the same as that of the target base station, the target base station may still send the first indication information to the terminal device, to indicate transmission of the data packet from the terminal device to the upper layer entity, so that continuity of the first service is ensured, and reliability of a communication system is improved. Certainly, in some scenarios, to save signaling and communication resources, the target base station may not send the first indication information to the terminal device, and the terminal device sends, to the upper layer entity in ascending order of sequence numbers, all data packets received from the first base station and the second base station.

In addition, the first indication information exists in both the first implementation and the second implementation. The two implementations relate to different scenarios, and the first indication information is not simultaneously used in the first implementation and the second implementation. Therefore, the first indication information in the two implementations may be carried by using same signaling or a same field. In this way, signaling can be saved, and signaling design complexity can be reduced. To more clearly distinguish between the two indications, in this application, the first indication information in the foregoing two implementations may alternatively be carried by using different signaling or fields.

The foregoing mainly describes the solutions provided in embodiments of the present invention from a perspective of interaction between network elements. It may be understood that, to implement the foregoing functions, the network elements such as the network device and the terminal device include corresponding hardware structures and/or software modules for performing the functions. A person skilled in the art should easily be aware that, in combination with the units and algorithm steps in the examples described in the embodiments disclosed in this specification, the present invention can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The following provides a further description based on the possible structure of the terminal device in FIG. 3. The terminal device can perform any method in embodiments of the present invention. The terminal device may include at least the transceiver 301 and at least one processor 304 (where the processor is a general expression herein, and may represent the modem processor 304 or represent the modem processor 304 and the application processor 302). Optionally, the terminal device may further include another component in FIG. 3 and the descriptions about FIG. 3, for example, the memory. Herein, the transceiver 301 may include an independent receiver and an independent transmitter, to separately perform corresponding receiving and sending functions; or may be a transceiver that integrates the receiving and sending functions. This is not further limited herein. The transceiver 301 in FIG. 3 may be structurally split into a receiver 301A and a transmitter 301B. The terminal device is only used as an example of an optional main body for description herein. The following provides a description by using a communication apparatus as a main body. The communication apparatus may be a unit, a chip, or a component included in the terminal device, or may be the terminal device.

Herein, it should be noted that when the communication apparatus is the chip, the transceiver is a communication interface, and the communication interface provides input and output of data and/or instructions for the at least one processor. When the communication apparatus is the terminal device, the transceiver may be a transceiver antenna, or an input/output component connected to the transceiver antenna.

In an optional design, the communication apparatus includes the at least one processor 304 and the receiver 301A.

The receiver is configured to: receive, from a first base station, at least one first data packet that is of a first service and that is sent in a multicast transmission mode; and receive first indication information from the first base station.

Further, optionally, a part of or all data packets in the at least one first data packet are sent to an upper layer entity of the terminal device based on the first indication information. This step may be performed by a logical entity or the processor. The logical entity or the processor is configured to perform interaction between entities at different layers inside the terminal device, for example, sending from a PDCP entity to the upper layer entity. For details, refer to descriptions of a corresponding part in FIG. 3. Herein, it should be noted that there may be one or more logical entities or processors, that is, interaction between entities at different layers may be performed by different logical entities or processors, or may be performed by a same logical entity or processor. For ease of description, a logical entity, a processor, or a transmitter configured to perform the step of sending to the upper layer entity is collectively referred to as a logical sending unit in the following descriptions.

In an optional implementation, the logical entity may be implemented in the at least one processor 304 or the transmitter 301B. In another optional implementation, the logical entity is a virtual functional module, and is configured to implement the foregoing function.

Optionally, the processor is configured to determine the part of or all the data packets in the at least one data packet based on the first indication information.

In a first implementation, compared with a target base station to which the terminal device is handed over, a source base station that serves the terminal device before the terminal device is handed over has slower transmission progress for a data packet of the first service. After the terminal device is handed over to the target base station, a part of data packets may be lost, causing service interruption. Therefore, in this implementation, the following operations are performed.

The receiver is further configured to receive, from the target base station, at least one second data packet that is of the first service and that is sent in a unicast transmission mode. Further, the logical sending unit is further configured to send the at least one first data packet and the at least one second data packet to the upper layer entity based on the first indication information.

In an implementation, the first indication information is for indicating that transmission of the at least one second data packet is completed; or the first indication information is for indicating to release a bearer used for the at least one second data packet; or the first indication information is for indicating to deactivate unicast transmission of the at least one second data packet.

Further, optionally, after the first indication information is received, the logical sending unit is configured to: send the at least one second data packet to the upper layer entity, and then send the at least one first data packet to the upper layer entity. The at least one first data packet is sent in ascending order of a sequence number of the at least one first data packet, and the at least one second data packet is sent in ascending order of a sequence number of the at least one second data packet.

In another implementation, the first indication information includes or indicates a first sequence number, where the first sequence number is a largest sequence number in a sequence number of the at least one second data packet; or the first indication information includes a first sequence number and second indication information, where the second indication information is for indicating that the first sequence number is a largest sequence number in a sequence number of the at least one second data packet.

Further, optionally, after the first indication information is received, the logical sending unit is configured to send the at least one first data packet to the upper layer entity after sending, to the upper layer entity, a data packet that is in the at least one second data packet and whose sequence number is less than or equal to the first sequence number.

In a specific transmission process, the at least one first data packet is received by using a first bearer, and the at least one second data packet is received by using a second bearer. The first bearer is the same as or different from the second bearer.

In a second implementation, compared with the target base station to which the terminal device is handed over, the source base station that serves the terminal device before the terminal device is handed over has faster transmission progress for the data packet of the first service. After the terminal device is handed over to the target base station, a part of data packets may be repeatedly received, causing a waste of resources or an error in processing of the first service. Therefore, in this implementation, the following operations are performed.

In an implementation, the first indication information is for indicating that a data packet to be sent to the upper layer entity is a data packet that is in the at least one first data packet and whose receiving moment is later than a receiving moment of the first indication information.

Further, the logical sending unit is configured to send, to the upper layer entity in ascending order of a sequence number of the data packet, the data packet that is in the at least one first data packet and whose receiving moment is later than the receiving moment of the first indication information.

In another implementation, the first indication information is a second sequence number.

Further, the logical sending unit is configured to send, to the upper layer entity, a data packet that is in the at least one first data packet and whose sequence number is greater than the second sequence number. Optionally, a data packet that is in the at least one first data packet and whose sequence number is not greater than the second sequence number is discarded. The discarding step may be performed by the logical sending unit or a corresponding logical entity, for example, an RLC entity, a PDCP entity, or another layer 2 entity. From a perspective of a hardware entity, the discarding step may also be that the at least one processor deletes or discards, based on a program or an instruction, the foregoing data packet that is in a corresponding storage resource, for example, deletes the data packet that is in a memory or a storage space corresponding to a layer 2 entity and whose sequence number is not greater than the second sequence number in the at least one first data packet. Alternatively, the logical sending unit is configured to send, to the upper layer entity, a data packet that is in the at least one first data packet and whose sequence number is not less than the second sequence number. Optionally, a data packet that is in the at least one first data packet and whose sequence number is less than the second sequence number is discarded. The discarding step may be performed by the logical sending unit or a corresponding logical entity, for example, an RLC entity, a PDCP entity, or another layer 2 entity. Details are not described again.

In the second implementation, the logical sending unit is configured to send the part of or all the data packets in the at least one first data packet to the upper layer entity in ascending order of sequence numbers of the data packets.

It should be noted that, for a specific implementation of a communication method performed by the communication apparatus, refer to the descriptions of the communication method provided in embodiments of the present invention. The terminal device in this embodiment of the present invention and the communication methods corresponding to FIG. 6, FIG. 7, and FIG. 9 are based on a same concept, and technical effects brought by the terminal device are the same as those of the communication methods. Specific functions of the processor and the receiver included in the communication apparatus in this embodiment of the present invention and any features, terms, and implementation details that are related to the specific functions correspond to the functions of the terminal device in the method embodiments corresponding to FIG. 6, FIG. 7, and FIG. 9. For specific content, refer to the descriptions in the method embodiments corresponding to FIG. 6, FIG. 7, and FIG. 9 in the present invention. Details are not described herein again.

It should be noted that, all or some of the foregoing embodiments may be implemented by the communication apparatus by using software, hardware, firmware, or any combination thereof.

Figure 10:
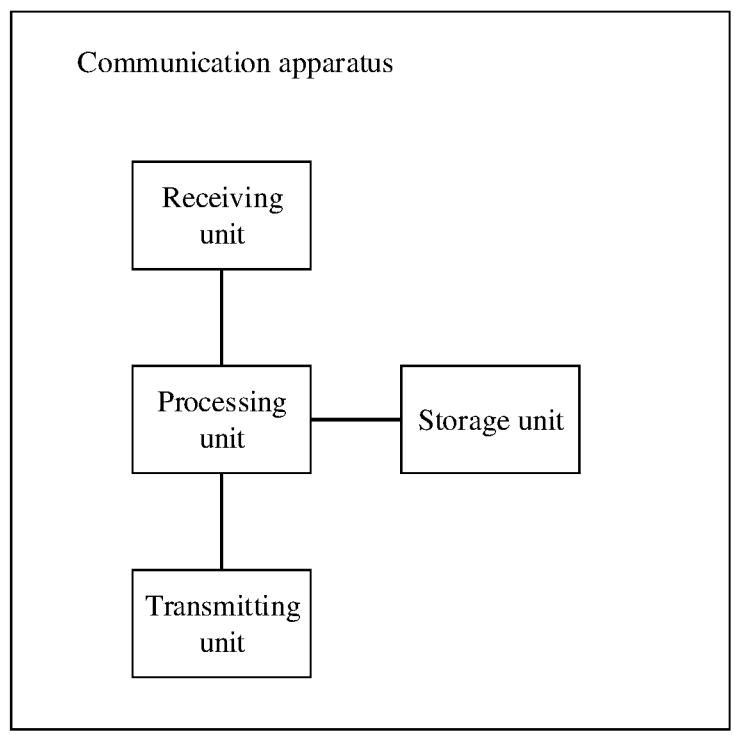
FIG. 10 is a schematic diagram of a structure of a communication apparatus according to an embodiment of this application.

For a structure of the communication apparatus, in another optional manner, a corresponding component in the foregoing embodiment may be implemented by corresponding hardware, or may be implemented by a corresponding functional unit or software. For example, the transmitter 301B may be hardware performing the foregoing sending function, for example, a transceiver integrating receiving and sending functions or a transmitter implementing only a receiving function, may be a general-purpose processor or another hardware device that can execute a corresponding computer program to complete the foregoing function, or may be a software module or a functional unit that performs the corresponding function, for example, a transmitting unit. For another example, the processor 304 may be hardware performing a function of the processor, for example, a processor with a specific function or a general-purpose processor, may be another hardware device that can execute a corresponding computer program to complete the foregoing function, or may be a software module or a functional unit that performs the corresponding function, for example, a processing unit. For still another example, the receiver 301A may be hardware performing the foregoing receiving function, for example, a transceiver integrating receiving and sending functions or a receiver implementing only a receiving function, may be a general-purpose processor or another hardware device that can execute a corresponding computer program to complete the foregoing function, or may be a software module or a functional unit that performs the corresponding function, for example, a receiving unit. Optionally, the communication apparatus may further include a storage unit. For details, refer to FIG. 10.

The following provides a further description based on the possible structure of the network device in FIG. 2. The network device can perform any method in embodiments of the present invention. The network device may include at least the transceiver 202 and at least one controller/processor 201 (where the processor 201 is used as an example for description below). Optionally, the network device may further include another component in FIG. 2 and the descriptions about FIG. 2, for example, the memory. Herein, the transceiver 202 may include an independent receiver and an independent transmitter, to separately perform corresponding receiving and sending functions; or may be a transceiver that integrates the receiving and sending functions. This is not further limited herein. The transceiver 202 in FIG. 2 may be structurally split into a receiver 202A and a transmitter 202B. The network device is only used as an example of an optional main body for description herein. The following provides a description by using a communication apparatus as a main body. The communication apparatus may be a unit, a chip, or a component included in the network device, or may be the network device.

Herein, it should be noted that when the communication apparatus is the chip, the transceiver is a communication interface, and the communication interface provides input and output of data and/or instructions for the at least one processor. When the communication apparatus is the network device, the transceiver may be a transceiver antenna, or an input/output component connected to the transceiver antenna.

In an optional design, the communication apparatus includes the at least one controller/processor 201 and the transmitter 202B. The transmitter is configured to: send at least one data packet of a first service to a terminal device; and send first indication information to the terminal device, where the first indication information is for indicating transmission that is of the terminal device and that corresponds to a part of or all data packets in the at least one data packet.

The at least one data packet is at least one first data packet sent in a multicast transmission mode. Alternatively, the at least one data packet is at least one second data packet sent in a unicast transmission mode, and the first indication information is for indicating a part of or all data packets in the at least one second data packet.

In a first implementation, the at least one data packet is the at least one first data packet sent in the multicast transmission mode.

For example, the first indication information is for indicating a part of or all data packets that are in the at least one first data packet and whose receiving moments are later than a receiving moment of the first indication information; the part of or all the data packets in the at least one data packet are data packets that are in the at least one first data packet and whose receiving moments are later than the receiving moment of the first indication information.

For another example, the first indication information is a second sequence number, and the second sequence number is a smallest sequence number in sequence numbers of a part of or all data packets in the at least one first data packet, or the second sequence number is a largest sequence number in a sequence number of a data packet other than a part of data packets in the at least one first data packet.

In a second implementation, the at least one data packet is the at least one second data packet sent in the unicast transmission mode, and the first indication information is for indicating the part of or all the data packets in the at least one second data packet.

Further, the transmitter is configured to send at least one first data packet of the first service to the terminal device in a multicast transmission mode, where the first indication information is for indicating transmission that is of the terminal device and that corresponds to the at least one first data packet and the at least one second data packet.

In an implementation, the first indication information is for indicating that transmission of the at least one second data packet is completed; or the first indication information is for indicating to release a bearer used for the at least one second data packet; or the first indication information is for indicating to deactivate unicast transmission of the at least one second data packet.

In this implementation, transmission that is of the terminal device and that corresponds to a part of or all data packets in the at least one first data packet and the at least one second data packet includes: For the terminal device, transmission corresponding to the at least one first data packet is performed after transmission corresponding to the at least one second data packet.

In another implementation, the first indication information includes or indicates: a first sequence number, where the first sequence number is a largest sequence number in a sequence number of the at least one second data packet; or a first sequence number and second indication information, where the second indication information is for indicating that the first sequence number is a largest sequence number in a sequence number of the at least one second data packet.

Further, transmission that is of the terminal device and that corresponds to a part of or all data packets in the at least one first data packet and the at least one second data packet includes:

For the terminal device, transmission corresponding to the at least one first data packet is performed after transmission corresponding to a data packet that is in the at least one second data packet and whose sequence number is less than or equal to the first sequence number.

In this implementation, the at least one first data packet is sent by using a first bearer, and the at least one second data packet is sent by using a second bearer.

Further, optionally, the transmitter is further configured to send third indication information to the terminal device, where the third indication information is for indicating that the first bearer is associated with the second bearer, or the third indication information is for indicating that the first bearer and the second bearer correspond to the first service.

It should be noted that, for a specific implementation of a communication method performed by the communication apparatus, refer to the descriptions of the communication method provided in embodiments of the present invention. The terminal device in this embodiment of the present invention and the communication methods corresponding to FIG. 6, FIG. 7, and FIG. 9 are based on a same concept, and technical effects brought by the terminal device are the same as those of the communication methods. Specific functions of the processor and the transmitter included in the communication apparatus in this embodiment of the present invention and any features, terms, and implementation details that are related to the specific functions correspond to the functions of the network device (for example, the first base station) in the method embodiments corresponding to FIG. 6, FIG. 7, and FIG. 9. For specific content, refer to the descriptions in the method embodiments corresponding to FIG. 6, FIG. 7, and FIG. 9 in the present invention. Details are not described herein again.

It should be noted that, all or some of the foregoing embodiments may be implemented by the communication apparatus by using software, hardware, firmware, or any combination thereof.

For a structure of the communication apparatus, in another optional manner, a corresponding component in the foregoing embodiment may be implemented by corresponding hardware, or may be implemented by a corresponding functional unit or software. For example, the transmitter 202B may be hardware performing the foregoing sending function, for example, a transceiver integrating receiving and sending functions or a transmitter implementing only a receiving function, may be a general-purpose processor or another hardware device that can execute a corresponding computer program to complete the foregoing function, or may be a software module or a functional unit that performs the corresponding function, for example, a transmitting unit. For another example, the processor 201 may be hardware performing a function of the processor, for example, a processor with a specific function or a general-purpose processor, may be another hardware device that can execute a corresponding computer program to complete the foregoing function, or may be a software module or a functional unit that performs the corresponding function, for example, a processing unit. For still another example, the receiver 202A may be hardware performing the foregoing receiving function, for example, a transceiver integrating receiving and sending functions or a receiver implementing only a receiving function, may be a general-purpose processor or another hardware device that can execute a corresponding computer program to complete the foregoing function, or may be a software module or a functional unit that performs the corresponding function, for example, a receiving unit.

Optionally, the communication apparatus may further include a storage unit. For details, refer to FIG. 10.

This application further provides a communication system, including at least one network device and at least one terminal device. Further, the network device includes at least one of a source base station and a target base station. The network device can implement a function on a network side in any possible implementation of embodiments of the present invention, and the terminal device can implement a function on a terminal side in any possible implementation of this application.

It may be understood that the accompanying drawings show only simplified designs of communication apparatuses. During actual application, the communication apparatus may include any quantities of transmitters, receivers, processors, controllers, memories, communication units, and the like.

An embodiment of the present invention further provides an apparatus (for example, an integrated circuit, a wireless device, or a circuit module), configured to implement the foregoing communication method. An apparatus for implementing a power tracker and/or a power generator described in this specification may be a standalone device or may be a part of a larger device. The device may be (i) an independent IC; (ii) a set that includes one or more ICs and that may include a memory IC configured to store data and/or an instruction; (iii) an RFIC, for example, an RF receiver or an RF transmitter/receiver; (iv) an ASIC, for example, a mobile station modem; (v) a module that can be built into another device; (vi) a receiver, a cellular phone, a wireless device, a handheld machine, or a mobile unit; or (vii) the like.

A person skilled in the art may clearly understand that, for the purpose of convenient and brief description, for detailed working processes of the foregoing systems, apparatuses, and units, refer to corresponding processes in the foregoing method embodiments. Details are not described herein again.

A person of ordinary skill in the art may be aware that, in combination with the units and algorithm steps in the examples described in the embodiments disclosed in this specification, this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of the present invention.

The computer-readable storage medium in embodiments of this application may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of embodiments of the present invention.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:
receiving, from a first base station, at least one first data packet that is of a first service and that is sent in a multicast transmission mode;
receiving, separately from the at least one first data packet, first indication information from the first base station; and
delivering a part of or all data packets in the at least one first data packet to an upper layer of a terminal device based on the first indication information.

2. The method according to claim 1, further comprising:
receiving, from the first base station, at least one second data packet that is of the first service and that is sent in a unicast transmission mode,
wherein the delivering the part of or all data packets in the at least one first data packet to the upper layer based on the first indication information comprises:
delivering the at least one first data packet and the at least one second data packet to the upper layer based on the first indication information which indicates that the at least one first data packet and the at least one second data packet correspond to the same first service and are to be transmitted to the upper layer of the terminal device.

3. The method according to claim 2, wherein
the first indication information indicates that transmission of the at least one second data packet is completed; or
the first indication information indicates to release a bearer used for the at least one second data packet; or
the first indication information indicates to deactivate unicast transmission of the at least one second data packet.

4. The method according to claim 2, wherein the delivering the at least one first data packet and the at least one second data packet to the upper layer based on the first indication information comprises:
in response to receiving the first indication information, delivering the at least one second data packet to the upper layer, and then
delivering the at least one first data packet to the upper layer, wherein
the at least one first data packet is sent in ascending order of a sequence number of the at least one first data packet, and the at least one second data packet is sent in ascending order of a sequence number of the at least one second data packet.

5. The method according to claim 2, wherein the first indication information comprises:
a first sequence number, wherein the first sequence number is a largest sequence number in a sequence number of the at least one second data packet; or a first sequence number and second indication information, wherein the second indication information indicates that the first sequence number is a largest sequence number in a sequence number of the at least one second data packet.

6. The method according to claim 5, wherein the delivering the at least one first data packet and the at least one second data packet to the upper layer based on the first indication information comprises:
delivering the at least one first data packet to the upper layer after delivering, to the upper layer, a data packet that is in the at least one second data packet and has a sequence number less than or equal to the first sequence number.

7. A communication method, comprising:
performing, by a target base station, a handover of a terminal device from a source base station to the target base station, wherein the terminal device currently receives from the source base station a first service in a multicast transmission mode,
upon completion of the handover, delivering, by the target base station, at least one data packet of the first service to the terminal device; and
delivering, by the target base station, first indication information to the terminal device, wherein the first indication information indicates transmission of a part of or all data packets in the at least one data packet to an upper layer of the terminal device.

8. The method according to claim 7, wherein
the first indication information is
a smallest sequence number in sequence numbers of the part of or all data packets in the at least one data packet, or
a largest sequence number in a sequence number of a data packet other than the part of data packets in the at least one data packet.

9. The method according to claim 7, wherein
the at least one data packet is at least one second data packet sent in a unicast transmission mode, and
the first indication information indicates the part of or all data packets in the at least one second data packet to be transmitted in said transmission to the upper layer of the terminal device.

10. The method according to claim 9, further comprising:
delivering, by the target base station, at least one first data packet of the first service to the terminal device in the multicast transmission mode, wherein
the first indication information indicates that the at least one first data packet and the at least one second data packet correspond to the same first service and are to be transmitted in said transmission to the upper layer of the terminal device.

11. A communication apparatus, comprising one or more processors, and a memory configured to store program instructions;
wherein, when executed by the one or more processors, the instructions cause the communication apparatus, which is a terminal device, to perform:
in response to receiving a command for a handover while currently receiving from a source base station a first service in a multicast transmission mode, leaving the source base station and synchronizing with a first base station which is a target base station;
upon completion of the handover, receiving, from the first base station, at least one first data packet that is of the first service and that is sent in the multicast transmission mode;

receiving first indication information from the first base station; and delivering a part of or all data packets in the at least one first data packet to an upper layer of the terminal device based on the first indication information.

12. The apparatus according to claim 11, wherein the instructions further cause the communication apparatus to perform:

receiving, from the first base station, at least one second data packet that is of the first service and that is sent in a unicast transmission mode, wherein the delivering the part of or all data packets in the at least one first data packet to the upper layer based on the first indication information comprises:

delivering the at least one first data packet and the at least one second data packet to the upper layer based on the first indication information which indicates that the at least one first data packet and the at least one second data packet correspond to the same first service and are to be transmitted to the upper layer of the terminal device.

13. The apparatus according to claim 12, wherein the first indication information indicates that transmission of the at least one second data packet is completed; or the first indication information indicates to release a bearer used for the at least one second data packet; or the first indication information indicates to deactivate unicast transmission of the at least one second data packet.

14. The apparatus according to claim 12, wherein the delivering the at least one first data packet and the at least one second data packet to the upper layer based on the first indication information comprises:

in response to receiving the first indication information, delivering the at least one second data packet to the upper layer, and then delivering the at least one first data packet to the upper layer, wherein the at least one first data packet is sent in ascending order of a sequence number of the at least one first data packet, and the at least one second data packet is sent in ascending order of a sequence number of the at least one second data packet.

15. The apparatus according to claim 12, wherein the first indication information comprises:

a first sequence number, wherein the first sequence number is a largest sequence number in a sequence number of the at least one second data packet; or a first sequence number and second indication information, wherein the second indication information indicates that the first sequence number is a largest sequence number in a sequence number of the at least one second data packet.

16. The apparatus according to claim 15, wherein the delivering the at least one first data packet and the at least one second data packet to the upper layer based on the first indication information comprises:

delivering the at least one first data packet to the upper layer after delivering, to the upper layer, a data packet that is in the at least one second data packet and has a sequence number less than or equal to the first sequence number.

17. A communication apparatus, comprising one or more processors, and a memory configured to store program instructions;

wherein, when executed by the one or more processors, the instructions cause the communication apparatus to perform:

a handover of a terminal device from a source base station to the communication apparatus which is a target base station, wherein the terminal device currently receives from the source base station a first service in a multicast transmission mode;

upon completion of the handover, delivering at least one data packet of the first service to the terminal device; and delivering, separately from the at least one data packet, first indication information to the terminal device, wherein the first indication information indicates transmission of a part of or all data packets in the at least one data packet to an upper layer of the terminal device.

18. The apparatus according to claim 17, wherein the first indication information is a smallest sequence number in sequence numbers of the part of or all data packets in the at least one data packet, or a largest sequence number in a sequence number of a data packet other than the part of data packets in the at least one data packet.

19. The apparatus according to claim 17, wherein the at least one data packet is at least one second data packet sent in a unicast transmission mode, and the first indication information indicates the part of or all data packets in the at least one second data packet to be transmitted in said transmission to the upper layer of the terminal device.

20. The apparatus according to claim 19, wherein the instructions further cause the apparatus to perform:

delivering at least one first data packet of the first service to the terminal device in the multicast transmission mode, wherein the first indication information indicates that the at least one first data packet and the at least one second data packet correspond to the same first service and are to be transmitted in said transmission to the upper layer of the terminal device.

\* \* \* \* \*

UNITED STATES PATENT AND TRADEMARK OFFICE
CERTIFICATE OF CORRECTION

| | |
|---|---|
| PATENT NO. | : 12,335,817 B2 |
| APPLICATION NO. | : 17/809778 |
| DATED | : June 17, 2025 |
| INVENTOR(S) | : Bin Xu and Bingzhao Li |

It is certified that error appears in the above-identified patent and that said Letters Patent is hereby corrected as shown below:

In the Specification

The second paragraph of the detailed description of embodiments (Column 9, Lines 58-65) should be replaced with the following:
In embodiments of the present invention, "a plurality of" means two or more than two. The term "and/or" describes an association relationship for describing associated objects and represents that three relationships may exist. For example, A and/or B may represent the following three cases: Only A exists, both A and B exist, and only B exists. The character "/" generally represents an "or" relationship between the associated objects.

Signed and Sealed this
Twenty-first Day of October, 2025

John A. Squires
*Director of the United States Patent and Trademark Office*